United States Patent
Lee et al.

(10) Patent No.: US 9,510,324 B2
(45) Date of Patent: Nov. 29, 2016

(54) METHOD FOR SETTING OPERATING CHANNEL IN WHITE SPACE BAND AND DEVICE THEREFOR

(71) Applicant: LG Electronics Inc., Seoul (KR)

(72) Inventors: Wookbong Lee, Gyeonggi-do (KR); Seunghee Han, Gyeonggi-do (KR); Suhwook Kim, Gyeonggi-do (KR); Yongho Seok, Gyeonggi-do (KR); Jinsam Kwak, Gyeonggi-do (KR); Jinyoung Chun, Gyeonggi-do (KR); Jaehyung Song, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 14/373,093

(22) PCT Filed: Jan. 18, 2013

(86) PCT No.: PCT/KR2013/000413
§ 371 (c)(1),
(2) Date: Jul. 18, 2014

(87) PCT Pub. No.: WO2013/109089
PCT Pub. Date: Jul. 25, 2013

(65) Prior Publication Data
US 2014/0376474 A1  Dec. 25, 2014

Related U.S. Application Data

(60) Provisional application No. 61/619,922, filed on Apr. 3, 2012, provisional application No. 61/588,114, filed on Jan. 18, 2012.

(51) Int. Cl.
*H04W 72/02* (2009.01)
*H04W 16/14* (2009.01)
(Continued)

(52) U.S. Cl.
CPC ............. *H04W 72/02* (2013.01); *H04W 16/14* (2013.01); *H04W 48/16* (2013.01); *H04W 84/12* (2013.01)

(58) Field of Classification Search
None
See application file for complete search history.

(56) References Cited

U.S. PATENT DOCUMENTS

2009/0196180 A1 * 8/2009 Bahl ................. H04L 5/0032
370/235
2010/0085921 A1  4/2010 Wu et al.
(Continued)

FOREIGN PATENT DOCUMENTS

KR  10-2011-0081939 A  7/2011
WO  2011/093642 A2  8/2011
(Continued)

OTHER PUBLICATIONS

International Search Report and Written Opinion issued in corresponding International Patent Application No. PCT/KR2013/000413 dated May 7, 2013.

*Primary Examiner* — Phirin Sam
*Assistant Examiner* — Peter Chau
(74) *Attorney, Agent, or Firm* — Morgan, Lewis & Bockius LLP

(57) ABSTRACT

Disclosed are a method for setting an operating channel in a white space band and a device therefor. Particularly, a method for enabling a first device to set an operating channel in a white space band comprises the steps of: acquiring information on an available TV channel from a geo-location database; and setting an operating channel on the basis of the information on the available TV channel, wherein a center frequency of the operating channel can be set differently according to a TV channel used by an incumbent device among TV channels adjacent to the TV channel on which the operating channel is set.

6 Claims, 20 Drawing Sheets

(51) Int. Cl.
*H04W 48/16* (2009.01)
*H04W 84/12* (2009.01)

(56) References Cited

U.S. PATENT DOCUMENTS

| | | | |
|---|---|---|---|
| 2010/0255794 A1 | 10/2010 | Agnew | |
| 2011/0069720 A1 | 3/2011 | Jacobs et al. | |
| 2011/0090887 A1* | 4/2011 | Kim | H04W 16/14 370/338 |
| 2011/0222488 A1 | 9/2011 | Kim et al. | |
| 2011/0268095 A1* | 11/2011 | Kim | H04W 16/14 370/338 |
| 2011/0287802 A1* | 11/2011 | Ma | H04L 5/0066 455/517 |
| 2012/0026941 A1* | 2/2012 | Ahmad | H04W 48/16 370/328 |
| 2012/0094681 A1* | 4/2012 | Freda | H04W 72/02 455/452.1 |
| 2012/0170534 A1 | 7/2012 | Kim et al. | |
| 2012/0201213 A1* | 8/2012 | Banerjea | H04W 72/0453 370/329 |
| 2012/0207033 A1* | 8/2012 | Hakola | H04W 16/14 370/252 |

FOREIGN PATENT DOCUMENTS

| | | | | |
|---|---|---|---|---|
| WO | WO 2011099687 A1 * | 8/2011 | | H04W 52/16 |
| WO | 2011/111917 A1 | 9/2011 | | |
| WO | WO 2011132837 A1 * | 10/2011 | | H04W 16/14 |

\* cited by examiner

METHOD FOR SETTING OPERATING CHANNEL IN WHITE SPACE BAND AND DEVICE THEREFOR

TECHNICAL FIELD

The present invention relates to a wireless communication system, and more particularly, to a method of configuring an operating channel on a white space band and apparatus for supporting the same.

BACKGROUND ART

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

Currently, IEEE 802.11af standard is being developed to regulate an operation of an unlicensed device on TVWS (TV whitespace) band.

A TV white space (TV WS) is a frequency assigned to a broadcast TV, includes a UHF (ultra high frequency) band and a VHF (very high frequency) band, and means the frequency bands allowed to be used for an unlicensed device under the condition that communications of a licensed device operating on the corresponding frequency bands are not interrupted. In particular, a device operating as an unlicensed device can use an available channel or frequency band currently not used by a licensed device on the corresponding frequency band. In this case, the licensed device may include one of a TV, a wireless microphone and the like. And, the licensed device may be called a licensed user, an incumbent user, a primary user or the like.

An unlicensed device desiring to use the TV WS band should provide a protective function for a licensed device. Hence, before starting a transmission of a signal on the TV WS band, it is mandatory for the unlicensed device to check whether a licensed device occupies the corresponding band in order to obtain available channel information.

To this end, the unlicensed device may check whether the corresponding band is used by a licensed device by performing a spectrum sensing. Spectrum sensing mechanism may include one of an energy detection scheme (i.e., a scheme of determining that an incumbent user is using a corresponding band if a strength of a received signal is equal to or greater than a predetermined value), a feature detection scheme (i.e., a scheme of determining that an incumbent user is using a corresponding band if a digital TV preamble is detected), and the like. If a strength of a signal received on a specific channel is equal to or greater than a predetermined value or a DTV (digital TV) preamble is detected, the unlicensed device can determine that the licensed device is currently using the specific channel. If it is determined that a licensed device is using a channel right adjacent to a currently used channel, a transmission power of an unlicensed device may be lowered depending on a level of an interference radiating into an adjacent band.

Yet, in case that an unlicensed device depends on a frequency sensing only to obtain available channel information from TV WS band, a burden due to a sensing for an operation on the TV WS band is further put on the unlicensed device and a corresponding procedure may be delayed. Hence, the unlicensed device accesses a geo-location database through Internet or a dedicated network and is then able to obtain channel list information on a list of channels available in a corresponding area. In this case, the geo-location database is configured to store and manage information on registered licensed devices and channel use information on a channel dynamically changing depending on geo-locations and channel used times of the licensed devices.

DISCLOSURE OF THE INVENTION

Technical Tasks

One object of the present invention is to propose a method of smoothly configuring an operating channel on a white space band in a wireless communication system, and more particularly, in a WLAN (wireless local area network) system supportive of operations on the white space band and apparatus therefor.

Another object of the present invention is to propose a method of smoothly configuring an operating channel in case of an operation on a white space band using a channel having a frequency bandwidth decreased by a down-clocking in an existing WLAN system and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of configuring an operating channel, which is configured by a first device on a white space band, according to one embodiment of the present invention may include the steps of obtaining an information on an available TV channel from a geo-location database and configuring the operating channel based on the information on the available TV channel, wherein a center frequency of the operating channel is set different depending on a TV channel used by an incumbent device among TV channels adjacent to a TV channel having the operating channel configured therein.

To further achieve these and other advantages and in accordance with the purpose of the present invention, as embodied and broadly described, in a first device for configuring an operating channel on a white space band, an apparatus according to another embodiment of the present invention may include an RF (radio frequency) unit configured to transceive a wireless signal and a processor obtaining an information on an available TV channel from a geo-location database, the processor configuring the operating channel based on the information on the available TV channel, wherein a center frequency of the operating channel is set different depending on a TV channel used by an incumbent device among TV channels adjacent to a TV channel having the operating channel configured therein.

Preferably, if a prescribed one of the TV channels adjacent to the TV channel having the operating channel configured therein is currently used by the incumbent device, the center frequency of the operating channel may be spaced apart from a center frequency of the operating channel configured TV channel by a prescribed frequency in a direction opposite to the TV channel currently used by the incumbent device.

Preferably, the prescribed frequency may be determined as a bandwidth of the TV channel and a minimum frequency bandwidth supported by the operating channel.

Preferably, the prescribed frequency may be determined as (N−B)/2 (where, the N is the bandwidth of the TV channel and the B indicates the minimum frequency bandwidth supported by the operating channel).

Preferably, if the operating channel configured TV channel includes two contiguous TV channels, the center frequency of the operating channel may be located on a boundary between the two contiguous TV channels.

Preferably, if the operating channel configured TV channel includes four contiguous TV channels, the center frequency of the operating channel may be located on a boundary between second and third TV channels among the four contiguous TV channels.

Preferably, if all of the TV channels adjacent to the operating channel configured TV channel are currently used by the incumbent device, the center frequency of the operating channel may be located at a center frequency of the operating channel configured TV channel.

Preferably, an information on a bandwidth of the configured operating channel may be periodically transmitted to a second device through a channel having a minimum frequency bandwidth supported by the operating channel.

Advantageous Effects

According to an embodiment of the present invention, it is able to smoothly configure an operating channel on a white space band in a wireless communication system, and more particularly, in a WLAN system supportive of an operation on the white space band.

According to an embodiment of the present invention, it is able to smoothly configure an operating channel in case of an operation on a white space band using a channel having a frequency bandwidth decreased by a down-clocking in an existing WLAN system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (third Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical idea of the present invention may be non-limited.

Figure 1:
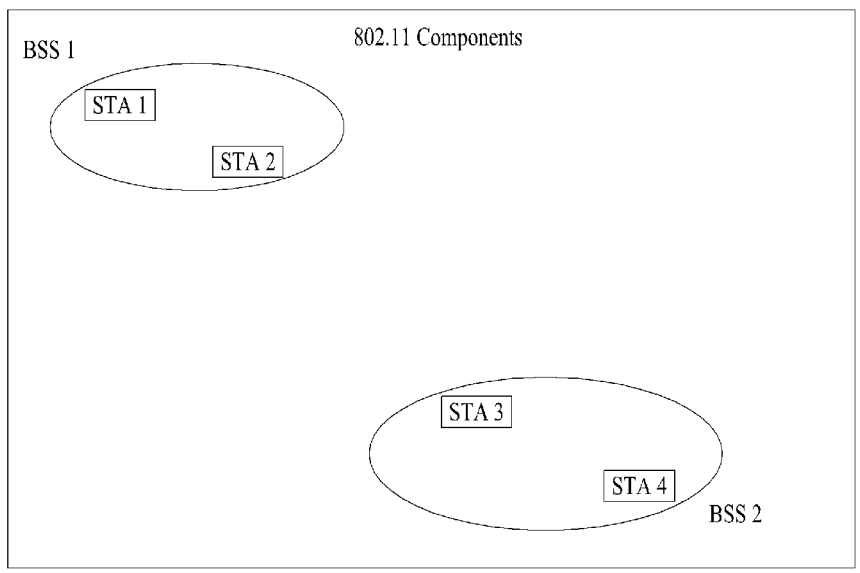
FIG. 1 is a diagram for one example of a structure of IEEE 802.11 system to which the present invention is applicable.

1. IEEE 802.11 System to which the Present Invention is Applicable 1.1. The General of System FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. Thus association may be dynamically configured or may include a use of a DSS (distribution system service).

Figure 2:
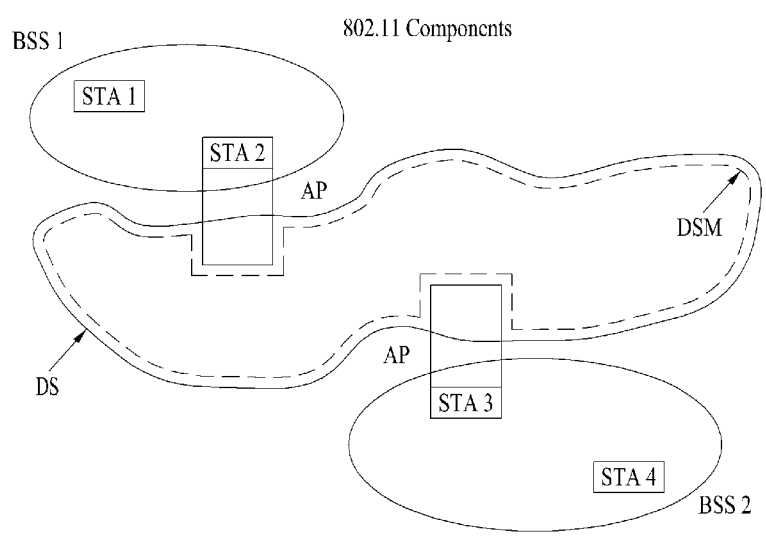
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DMS), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Once a controlled port is authenticated, a transmitted data (or frame) can be forwarded to a DS.

Figure 3:
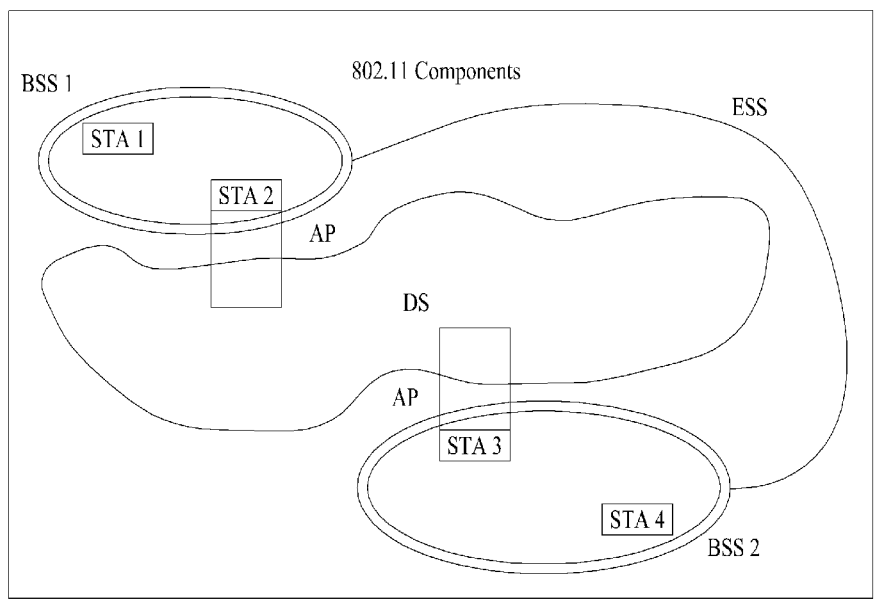
FIG. 3 is a diagram for further example of a structure of IEEE 802.11 system to which the present invention is applicable.

FIG. 3 is a diagram for a further example of a structure of IEEE 802.11 system to which the present invention is applicable. FIG. 3 conceptionally shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two difference access and security policies are necessary at the same location and the like.

Figure 4:
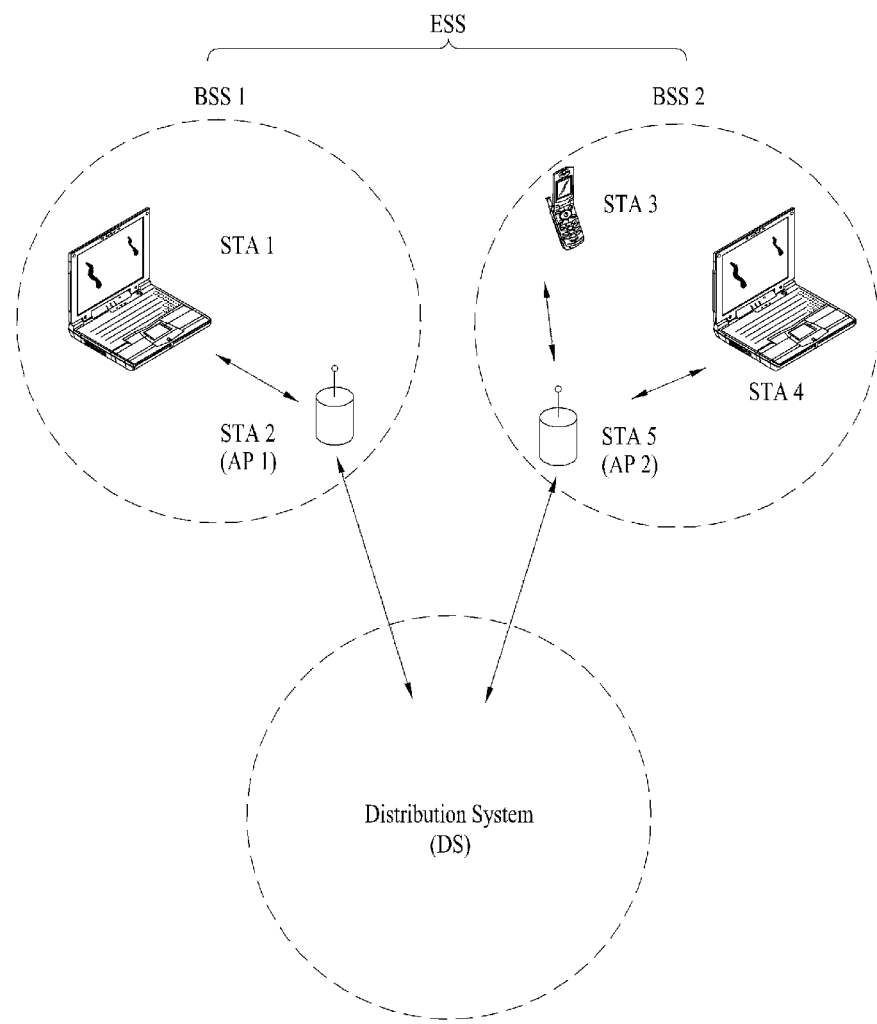
FIG. 4 is a diagram for one example of a structure of a WLAN system.

FIG. 4 is a diagram for one example of a structure of WLAN system. In particular, FIG. 4 shows one example of BSS of a basic structure including a DS.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to a Base Station (BS), a Node-B, an evolved Node-B (eNB), a Base Transceiver System (BTS), a Femto BS or the like in other wireless communication fields.

1.2. IEEE 802.11af

Currently, IEEE 802.11af standard is being developed to regulate an operation of an unlicensed device on TVWS (TV whitespace) band.

A TV white space (TV WS) is a frequency assigned to a broadcast TV, includes a UHF (ultra high frequency) band and a VHF (very high frequency) band, and means the frequency bands allowed to be used for an unlicensed device under the condition that communications of a licensed device operating on the corresponding frequency bands are not interrupted.

Areas may differ from each other in TVWS band or a bandwidth of each TV channel in the TVWS. For instance, in case of U.S.A., services are provided on VHF and UHF channel bands (e.g., 54~60 MHz, 76~88 MHz, 174~216 MHz, 512~608 MHz, and 614~698 MHz bands) as TVWS bands and a bandwidth of a single TV channel is defined as 6 MHz each. In case of U.K., services are provided on UHF TV channel band (e.g., 480~790 MHz band except 550~614 MHz band) as TVWS band and a bandwidth of a single TV channel is defined as 8 MHz each.

In order for an unlicensed device (e.g., an STA in WLAN system) to operate in TVWS, a protection scheme for a licensed device (or an incumbent user) should be provided primarily. Hence, an STA should operate on an available channel by obtaining the available channel unused by a licensed device so as to be available for an unlicensed device. If a channel currently used by the SAT does not correspond to the available channel anymore, the STA stops using the currently used channel.

In order for an STA to obtain channel availability in TVWS, the STA can obtain a TV channel schedule by performing a spectrum sensing or accessing a geo-location database (GDB). The GDB may be named a whitespace database (WDB). GDB information may include such information as a specific channel used schedule (i.e., a channel used time) of a licensed device at a specific location and the like. If an STA desires to obtain availability of a TV channel, it should obtain GDB information based on its location information by accessing a GDB through internet or the like. And, this should be performed by a time unit enough to protect a licensed device.

Currently, IEEE 802.11af standard mainly defines two kinds of device types. In particular, The device types are sorted into an enabling device configured as a device capable of accessing a GDB directly to obtain operation parameters specified to a geo-location, at which the device is located, and a dependent device configured as a device incapable of accessing a GDB directly to obtain operation parameters specified to a geo-location, at which the device is located, from an enabling device. The enabling device may be named a master device. And, the dependent device may be named a client device or a slave device. Thus, both of the enabling device and the dependent device may correspond to general STAs in a WLAN system. In particular, the terminology 'STA' includes AP and non-AP.

According to the regulation for TVWS of FCC (Federal Communications Commission), a personal/portable (P/P) device on a small-scale output and a fixed device on a large-scale output are defined. The P/P device can be carried by a person. And, the fixed device is operable at a fixed location. The P/P device can be sorted into a mode II device or a mode I device depending on having identification capability of its own location, i.e., geo-location capability and capability of an access to a GDB through an internet access. In this case, the mode II device or the fixed device may correspond to an enabling device (i.e., a master device). And, the mode I device may correspond to a dependent device (i.e., a client/slave device).

In the following description, one example of a process for a dependent device, which operates on a white space band, to obtain available channel information from an enabling device is explained. For clarity of the following description, a device capable of directly accessing a GDB shall be commonly called an enabling STA and a device incapable of directly accessing a GDB shall be commonly called a dependent STA.

Figure 5:
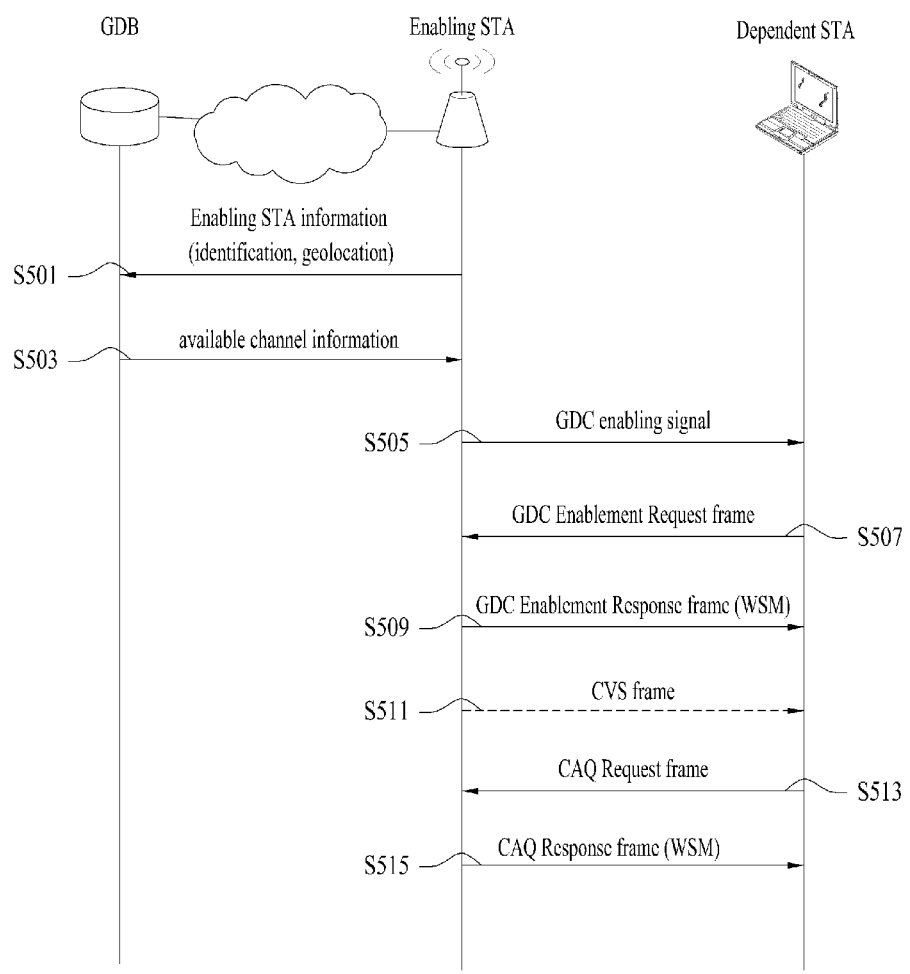
FIG. 5 is a diagram for one example of an operation between stations under the control of a geo-location database according to one embodiment of the present invention.

FIG. 5 is a diagram for one example of an operation between stations under the control of a geo-location database according to one embodiment of the present invention.

Referring to FIG. 5, an enabling STA accesses a GDB through internet or the like and is then able to transmit its own information (i.e., enabling STA information) to the GDB in accordance with the regulation of an area at which the enabling STA is located (S501]. In this case, the enabling STA information may include an identifier of the enabling STA and a geo-location information of the enabling STA. If necessary, the enabling STA may be able to transmit other information to the GDB as well.

Subsequently, the enabling STA can obtain an information (i.e., available channel information) on an list of available channels within TVWS band at its current location from the GDB (S503).

Having obtained the information on the available channel list from the GDB, the enabling STA can configure a BSS by transmitting a GDC enabling signal (i.e., a geo-location database controlled enabling signal) (S505). In particular, the enabling STA can transmit the GDC enabling signal through a channel on an available frequency in order to inform a dependent STA that a GDC enablement service is provided. In this case, the GDC enabling signal may correspond to a beacon frame and can be transmitted periodically.

In a specific regulatory domain, a secure authentication and/or association process with the dependent STA may be required for the enabling STA before the enabling STA transmits a GDC enablement response frame to the dependent STA. If such a requirement exists, the enabling STA accesses the GDB and is then able to check whether the corresponding dependent STA is authenticated to operate on a frequency band (e.g., TVWS).

If a dependent STA desires to participate in the BSS, the dependent STA can perform a scanning process on an operating channel in the TVWS. If the dependent STA is aware of the available channel list at its current location, the dependent STA can perform a passive or active scanning on channels on the available channel list only. In this case, the passive scanning means a process for the dependent STA to listen to a GDC enabling signal transmission from the enabling STA on the scanning channel. The active scanning means that the dependent STA transmits a probe request frame on the scanning channel and receives a probe response frame from the enabling STA. On the other hand, if the dependent STA is not aware of the available channel list at its current location, the dependent STA should receive a GDC enabling signal through the passive scanning. Thus, if the dependent STA receives the GDC enabling signal (or the probe response frame) from the enabling STA by the scanning operation, the corresponding dependent STA is then able to enter a state that a GDC enablement request frame can be transmitted to an enabling device.

Thereafter, in order to participate in the BSS, the dependent STA should operate under the control of the enabling STA.

In order to participate in the BSS after completion of the scanning process, the dependent STA can transmit the GDC enablement request frame to the enabling STA (S507).

Subsequently, having received the GDC enablement request frame, the enabling STA transmits a GDC enablement response frame to the dependent STA having transmitted the GDC enablement request frame (S509). In this case, the GDC enablement response frame can include a status code indicating an approval or declination for the GDC enablement request.

The GDC enablement response frame can include a white space map (WSM). The WSM is configured as a map of information on a channel available for an unlicensed device on TVWS band based on the channel and frequency information obtained by the enabling STA from the GDB. The WSM can include information on an available channel list or frequencies available for an unlicensed device and a maximum allowed transmission power for a corresponding available channel. In this case, channels included in the available channel list are the channels unused by signals (or users) supposed to be legally protected. And, the channels included in the available channel list are the channels that can be used by an unlicensed device at the timing point of an access to a GDB by the unlicensed device. If the unlicensed device makes a request for an available channel after a specific time from the timing point of the access to the GDB by the unlicensed device, information on a channel and frequency available from the corresponding timing point can be included. In case that the unlicensed device makes a request for an available channel to the GDB, the information on the available channel and frequency can be delivered in a manner of signaling a channel unavailable for the unlicensed device. In case that an operating channel bandwidth (WLAN channel) spans multiple channels indicated within the WSM, since the multiple channels may differ from each other in a maximum power level, a transmission power level for an actual operation may be limited by a minimum transmission power level among the multiple channels.

The WSM may include a map ID field, a channel number field, a maximum power level field, a valid time field and the like for example. And, WSM of another type including information on an available channel can apply to examples of the present invention.

The map ID field indicates an ID of an available channel list. The channel number field indicates a channel number available for a TVWS device. The channel number can be represented as a TV channel number, a spectrum range or the like and has a meaning as an information for specifying an available channel in a frequency domain. The maximum power level field indicates a maximum transmission power of a TVWS device on an available channel. The valid time field indicates a period for using an available channel persistently. The valid time field may be included not essentially but optionally.

Thereafter, the dependent STA is able to initiate t mutual transmissions and receptions for data, control, management frame and the like with the enabling STA.

The enabling STA can transmit the WSM to the dependent STA through a CAQ (channel availability query) response frame and a WSM announcement frame as well as through the GDC enablement response frame.

The enabling STA confirms that the dependent STA is located in a reception range of the corresponding enabling STA and is then able to periodically transmit a CVS (contact verification signal) frame to validate the available channel list (S511). In particular, the enabling STA is able to periodically transmit the CVS frame in order to validly maintain the contact with the dependent STA located within a service range of the enabling STA. In order to verify whether the dependent STA is located within the reception range of the enabling STA having provided the WSMs, the dependent STA receives the CVS frame from the enabling STA.

The dependent STA is able to periodically check what kind of channel is a currently valid channel in a manner of comparing a value of a map ID field of a previously received WSAM to a value of a map ID field of the CVS frame and is then able to determine that the WSAM failing to be indicated by the map ID of the CVS frame is not valid. If the values of the map ID fields are equal to each other, the dependent STA can continue to use a previous WSM on the assumption that the previous WSM is valid.

On the contrary, if the values of the map ID fields are different from each other, the previous WSM is no longer valid. So, in order to obtain information on a new available channel, the dependent STA transmits a CAQ (channel availability query) request frame to the enabling STA (S513).

Having received the CAQ request frame, the enabling STA transmits a CAQ (channel availability query) response frame to the corresponding dependent STA in order to update the information on the available channel (S515). In this case, the CAQ response frame can include an updated WSAM. Thereafter, the dependent STA receives the updated WSM, thereby initiating the mutual transmissions and receptions of data, control, management frame and the like with the enabling STA.

2. Channelization Method

A method of configuring a channel (or a band) (hereinafter named an operating channel or band to be discriminated from a TV channel) for a communication system (e.g., WLAN) operating in TVWS is necessary. A TV channel available for a TVWS device may be changed depending on a location of the device and the like. Particularly, in order to smoothly support an operation of a TVWS device despite that contiguous TV channels are not available on frequency, it is able to consider a method for a contiguous or non-contiguous operating channel to support the operation.

According to the present invention, a basic unit supported by an operating channel can be named a frequency segment. Assuming that a bandwidth of a basic unit supported by an operating channel is W MHz, a bandwidth of an operating channel in TVWS can be defined in a contiguous form such as W, 2W, 4W, 8W and the like or in a non-contiguous for such as 'W+W', '2W+2W' and the like. Information on such an operating channel width can be defined through an operation information element.

For instance, if W=2, it is able to define an operating channel (i.e., 2 MHz channel) configured with a single frequency segment, an operating channel (i.e., 4 MHz channel) configured with 2 contiguous frequency segments, an operating channel (i.e., 8 MHz channel) configured with 4 contiguous frequency segments, an operating channel (i.e., 16 MHz channel) configured with 8 contiguous frequency segments, and the like. Moreover, it is able to configure an operating channel (i.e., 2 MHZ+2 MHz channel) configured with 2 non-contiguous frequency segments), an operating channel (i.e., 4 MHz+4 MHz channel) configured with 2 non-contiguous frequency sections, each of which includes contiguous frequency segments, and the like. Yet, the assumption of 'W=2' is just one example. And, a scope of the present invention includes examples of a frequency segment having a different bandwidth.

A primary channel means an operating channel common to all STAs belonging to a BSS. In particular, the primary channel corresponds to a basic channel of an operation of an STA. Meanwhile, a secondary channel is a channel associated with a primary channel. And, the secondary channel is a channel used to support a wider bandwidth and a high throughput by being combined with a primary channel. For instance, assuming a case that 4 MHz channel is configured with two 2 MHz channels, a location of a primary channel should be determined in the channels. The location of the primary channel can indicate a higher frequency section or a lower frequency section in the two 2 MHz channels.

A configuration (i.e., channelization) of an operating channel for a system operating in TVWS can be determined based on an available TV channel (i.e., a TV channel not having an incumbent user exist thereon). For instance, by considering a case that it is impossible to use contiguous TV channels (i.e., a TV channel n is available but a TV channel n−1 and a TV channel n+1 are not available) or by considering how many contiguous TV channels are available if contiguous TV channels are available, channelization for a TVWS system can be determined. In particular, an operating channel can be configured.

Thus, a configuration information on an operating channel determined on the basis of an available TV channel can be provided to a dependent STA by an enabling STA. For instance, configuration information on an operating channel can include a channel start frequency, a channel width, a channel center frequency index (e.g., a center frequency index of a frequency segment including a primary channel, a center frequency index of a frequency segment not including a primary channel), a primary channel location and the like. In this case, the channel start frequency can be defined by an operating class information. Moreover, an information on the channel width (e.g., 2W, 4W, W+W, 2W+2W, etc.) can be defined by the operating channel information element or the like. Parameters for the channel center frequency index, the primary channel location and the like can be defined by PLME MIB (physical layer management entity management information base) and the like.

Meanwhile, in case of IEEE 802.11ac (very high throughput), frequency bandwidths of 20 MHz, 40 MHz, 80 MHz and 160 MHz are supported.

Figure 6:
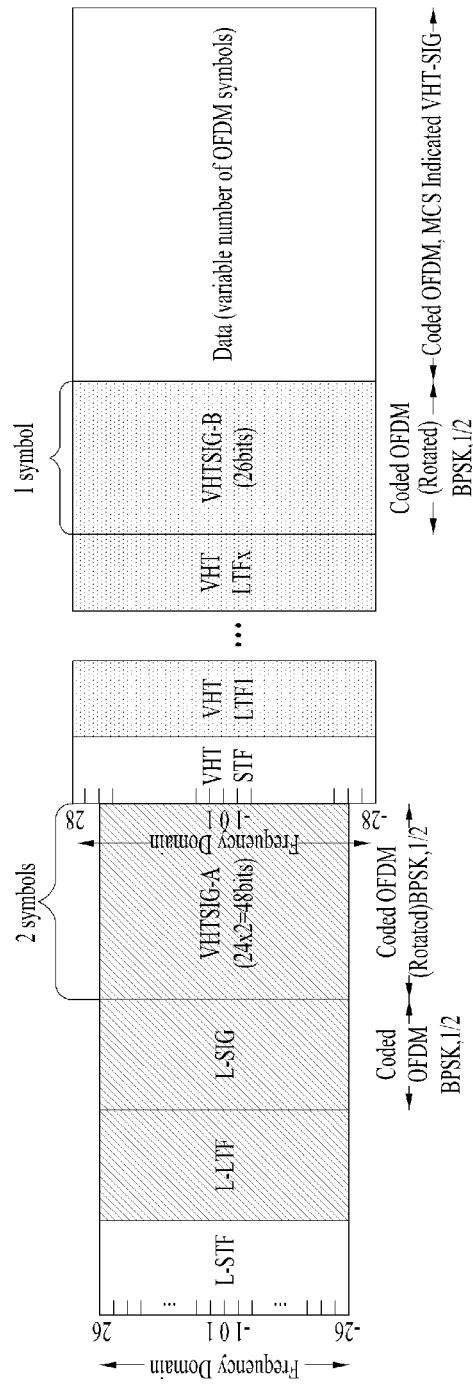
FIGS. 6 to 8 are diagrams for examples of a frame format when an operating channel uses a single bandwidth in IEEE 802.11ac system.
Figure 7:
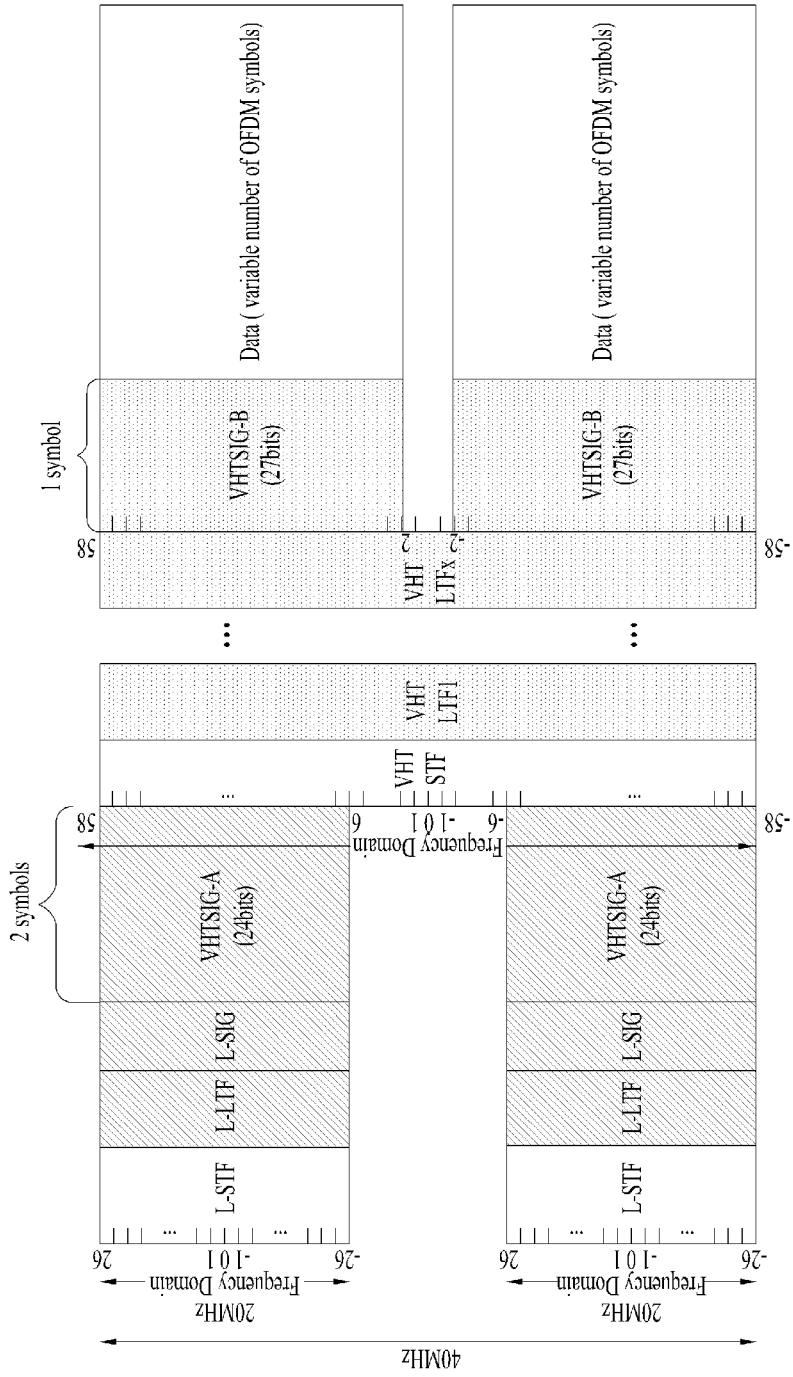
Figure 8:
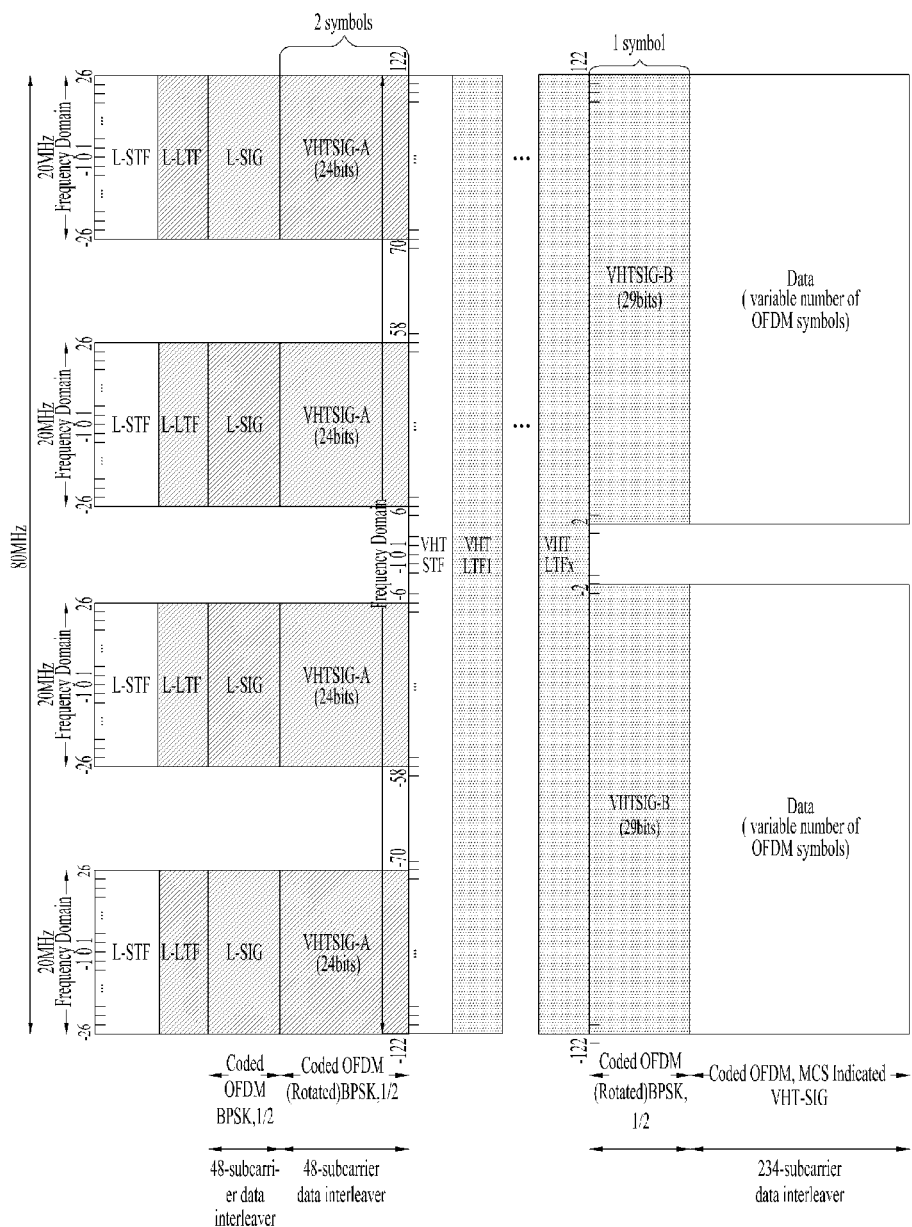

FIGS. 6 to 8 are diagrams for examples of a frame format when an operating channel uses a single bandwidth in IEEE 802.11ac system.

FIG. 6 shows a case that a single bandwidth is 20 MHz, FIG. 7 shows a case that a single bandwidth is 40 MHz, and FIG. 8 shows a case that a single bandwidth is 80 MHz. A frame configuration for a case that a single bandwidth is 160 MHz is not illustrated but can be represented using 2 frames of 80 MHz.

A frame format in IEEE 802.11ac system is configured by including L-STF (Non-HT Short Training field), L-LTF (Non-HT Long Training field), L-SIG (Non-HT SIGNAL) field, VHT-SIG-A (VHT Signal A) field, VHT-STF (VHT Short Training field), VHT-LTF (VHT Long Training field), VHT-SIG-B (VHT Signal B) field, and data field for transmitting PSDU(s) (PLCP service data unit(s)). In this case, the L-STF, L-LTF and L-SIG field configure a preamble of an IEEE 802.11ac system frame and a preamble section of each channel bandwidth has a structure that a preamble of a frame having a 20 MHz channel bandwidth is repeated. For instance, if a channel bandwidth is 40 MHz, a preamble of a frame having a channel bandwidth set to 20 MHz is repeatedly used twice. For another instance, if a channel bandwidth is 80 MHz, a preamble of a frame having a channel bandwidth set to 20 MHz is repeatedly used 4 times.

In a frame of IEEE 802.11ac, each of the L-STF, L-LTF, L-SIG field and VHT SIG-A field has actually used subcarriers of which number is equal to the number of subcarriers used by IEEE 802.11a or IEEE 802.11g system. This enables a legacy user of a system (e.g., IEEE 802.11a, IEEE 802.11g, etc.) to read a signal (SIG) of a corresponding frame. Yet, since a legacy user may not exist on a TVWS band used by IEEE 802.11af, the subcarrier number or OFDM parameter, which is used by the L-STF, the L-LTF, the L-SIG field and the VHT SIG-A field, can be set equal to that of the VHT-LTF or the data field. For instance, referring now to FIG. 6, each of the L-STF, the L-LTF, the L-SIG field and the VHT SIG-A field is configured with 52 subcarriers, but can be configured with 56 subcarriers like the VHT-LTF or the data field. Moreover, a name of each field can use a name different from a legacy name. For instance, the field names can be changed into O-STF (Omni-STF), O-LTF (Omni-LTF), O-SIG (Omni-SIG) field, WS SIG-A field, and the like.

According to IEEE 802.11af system, considered is a method of decreasing a bandwidth of a physical layer frame by down-clocking the physical layer frame of the IEEE 802.11ac standard described with reference to FIGS. 6 to 8. The down-clocking means a process for decreasing a frequency bandwidth eventually by a down-clocking ratio in a manner of increasing a sampling period greater than a previous one. For instance, it is able to make bandwidths of 20 MHz, 40 MHz and 80 MHz into 4 MHz, 8 MHz and 16 MHz by down-clocking a physical layer frame of IEEE 802.11ac system by 5 times. And, it is able to make bandwidths into 5 MHz, 10 MHz and 20 MHz by down-clocking a physical layer frame of IEEE 802.11ac system by 4 or 8 times. Moreover, it is able to make bandwidths into 40/6 MHz (=about 6.67 MHz), 80/6 MHz (=about 13.3 MHz) and the like by down-clocking a physical layer frame of IEEE 802.11ac system by 6 times.

Thus, in case that a frequency bandwidth is decreased by down-clocking a physical frame of IEEE 802.11ac system, channelization for a channel having a decreased frequency bandwidth is preferably taken into consideration. For instance, it is necessary to consider channelization for a case of making frequency bandwidths into 4 MHz, 8 MHz and 16 MHz by down-clocking a frame of IEEE 802.11ac system by 5 times, a case of making bandwidths into 5 MHz, 10 MHz and 20 MHz by down-clocking a frame of IEEE 802.11ac system by 4 or 8 times, a case of making bandwidths into 40/6 MHz (=about 6.67 MHz), 80/6 MHz (=about 13.3 MHz) and the like by down-clocking a frame of IEEE 802.11ac system by 6 times, and the like.

Moreover, if a channel bandwidth of a WS band is different from W MHz corresponding to a minimum channel bandwidth of IEEE 802.11af, it causes a problem that it is difficult to support channelization for an operating channel having a channel bandwidth of 2W, 4W, 8W or the like. For instance, assuming that a channel width of a WS band is 6 MHz and that a minimum channel bandwidth of IEEE 802.11af is 4 MHz, in case that a center frequency of an operating channel of IEEE 802.11af is matched to a center frequency of a TV channel with reference to a 4 MHz channel, it is difficult to support an operating channel having a frequency bandwidth of 8 MHz, 16 MHz or the like. Likewise, in case that a minimum channel bandwidth of IEEE 802.11af is 5 MHz, it is difficult to support 10 MHz, 20 MHz and the like with reference to 5 MHz channel. Moreover, assuming that a channel width of a WS band is 8 MHz and that a minimum channel bandwidth of IEEE 802.11af is 40/6 MHz (=about 6.67 MHz), it is difficult to support 80/6 MHz (=about 13.3 MHz) and the like with reference to a channel of 40/6 MHz (=about 6.67 MHz). The reason for this is that, if a center frequency of an operating channel having a minimum bandwidth (W) of IEEE 802.11af is matched to a center frequency of a TV channel, it may cause a problem that a center frequency of the corresponding W channel is not equal to a center frequency of a W channel included in an operating channel (2W or 4W) configured with contiguous frequency segment. Thus, as it causes a problem that a preamble is not co-located on a minimum bandwidth supported by an operating channel per channel bandwidth, it is unable to smoothly check (or verify) an operating channel through preamble detection. Hence, if channelization is performed using an operating channel of W MHz that is a minimum channel bandwidth of IEEE 802.11af, it causes a problem that it is difficult to support channelization for an operating channel having a channel bandwidth such as 2W, 4W, 8W and the like. Therefore, in case that a channel bandwidth of a WS band is different from W MHz that is a minimum channel bandwidth of IEEE 802.11af, a method for supporting channelization for an operating channel having a channel bandwidth such as 2W, 4W, 8W and the like is necessary.

In order to solve the above-mentioned problems, the present invention proposes a method of configuring an operating channel of a WLAN system on a white space band.

For clarity of the following description, assume that down-clocking ratios include 4 times, 5 times, 6 times and 8 times, by which the present invention is non-limited. And, a down-clocking can be performed at a different ratio. Moreover, down-clocking ratios for making 4 MHz, 5 MHz and 40/6 MHz (=about 6.67 MHz) may exist in various ways as well as 4 time, 5 times, 6 time and 8 times.

For clarity of the description, assume that a minimum bandwidth of an operating channel of WLAN used for TVWS of a specific country is B MHz (e.g., B=4 MHz, 5 MHz, 40/6 MHz (=about 6.67 MHz)). And, assume that a TV channel width for TVWS of a specific country is N MHz (e.g., N=6 MHz in U.S.A., N=8 MHZ in U.K., etc.)

For clarity of the description, examples of the present invention are described by taking TVWS as an example of a white space, by which the scope of the present invention is non-limited. In particular, the scope of the present invention includes examples of the present invention applying to operations in all white spaces controlled by a DB that provides information on an available channel at a specific location. For instance, an operation of an unlicensed equipment controlled by a GDB is expected to be allowed on a different frequency band expected to correspond to a white space in the future despite failing to correspond to a white space at the current timing point. And, examples according to the principles of the present invention applying to such expectation can be included in the scope of the present invention.

2.1. Embodiment 1

1) Channelization Method of Minimum Bandwidth B MHz

In order to perform channelization of a minimum bandwidth B MHz of WLAN operating channel, a center frequency of the WLAN operating channel can be located by being spaced apart from a center frequency of a TV channel instead of being matched to a center frequency of each TV channel. In this case, a value of the spaced frequency can be determined as a bandwidth of the TV channel and a minimum frequency bandwidth supported by an operating channel. In particular, the center frequency of the WLAN operating channel can be matched to in a manner of being shifted from the center frequency of the TV channel toward a lower or higher frequency by (N−B)/2 MHz. For instance, for an odd-numbered channel among TV channels of a corresponding area, a center frequency of a WLAN operating channel can be matched to a frequency higher than a center frequency of the TV channel by (N−B)/2 MHz. For instance, for an even-numbered channel among TV channels of a corresponding area, a center frequency of a WLAN operating channel can be matched to a frequency lower than a center frequency of the TV channel by (N−B)/2 MHz. On the other hand, for an odd-numbered TV channel and an even-numbered TV channel, a center frequency of a WLAN operating channel can be matched in a manner of being shifted in a direction opposite to the above-mentioned direction.

Moreover, after a predetermined range of TV channel has been designated, a shift direction of a center frequency of an odd/even numbered TV channel can be set different per specific range. For instance, in case of channels 21 to 36 among TV channels of a corresponding area, for an odd-numbered channel, a center frequency of a WLAN operating channel is matched to a frequency higher by (N−B)/2 MHz than a center frequency of the TV channel. And, for an even-numbered channel, a center frequency of a WLAN operating channel is matched to a frequency lower by (N−B)/2 MHz than a center frequency of the TV channel. On the contrary, in case of channels 38 to 51, for an even-numbered channel, a center frequency of a WLAN operating channel can be matched to a frequency higher by (N−B)/2 MHz than a center frequency of the TV channel. And, for an odd-numbered channel, a center frequency of a WLAN operating channel can be matched to a frequency lower by (N−B)/2 MHz than a center frequency of the TV channel.

In the following description, a case that a TV channel bandwidth N and a minimum bandwidth of an operating channel are 6 MHz and 4 MHz (B), respectively is taken as an example.

Figure 9:
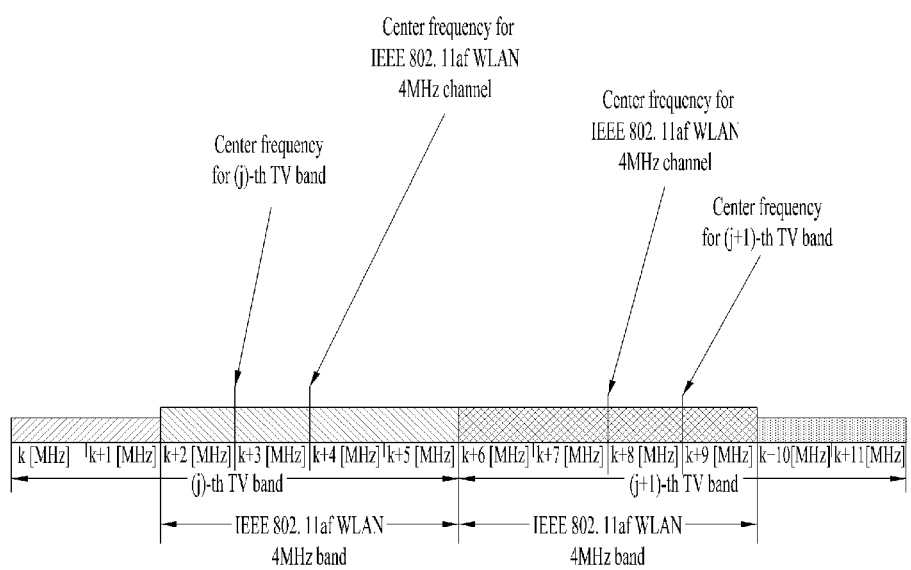
FIG. 9 is a diagram for one example of channelization according to the present invention in case that a single TV channel is available.

FIG. 9 is a diagram for one example of channelization according to the present invention in case that a single TV channel is available.

FIG. 9 shows one example of a case that a bandwidth of a WLAN operating channel is 4 MHz. And, a 4-MHz operating channel can be made by down-clocking a 20-MHz channel of IEEE 802.11ac by 5 times for example.

Referring to FIG. 9, a center frequency of an operating channel of IEEE 802.11af is not matched to a center frequency of a TV channel by applying the above-described method. Instead, a center frequency of an operating channel is matched in a manner of being shifted to a frequency lower or higher by 1 MHz (=(6−4)/2 MHz) for example. In particular, for $j^{th}$ TV channel, a center frequency of a WLAN operating channel is matched to a frequency higher by 1 MHz than a center frequency of a TV channel. For $(j+1)^{th}$ TV channel, a center frequency of a WLAN operating channel is matched to a frequency lower by 1 MHz than a center frequency of a TV channel.

As mentioned in the foregoing description, for an odd numbered TV channel, a center frequency of 802.11af operating channel is matched to a frequency higher by 1 MHz than a center frequency of a TV channel. And, for an even numbered TV channel, a center frequency of 802.11af operating channel is matched to a frequency lower by 1 MHz than a center frequency of a TV channel. If this method applies, $j^{th}$ TV channel may correspond to an odd numbered TV channel and $(j+1)^{th}$ TV channel may correspond to an even numbered TV channel. On the contrary, in case that a center frequency of a WLAN operating channel is matched for an odd numbered channel and an even numbered channel in a manner of being shifted in a direction opposite to that of the above method, $j^{th}$ TV channel may correspond to an even numbered TV channel and $(j+1)^{th}$ TV channel may correspond to an odd numbered TV channel.

Moreover, as mentioned in the foregoing description, when a shift direction of a center frequency of an odd/even numbered TV channel is set different per specific range of a TV channel, if $j^{th}$ TV channel belongs to TV channels 21 to 36, it may correspond to an odd numbered TV channel. If the $j^{th}$ TV channel belongs to TV channels 38 to 51, it may correspond to an even numbered TV channel.

2) Channelization Method for Contiguous 2*B MHz

If an operating channel is defined in a contiguous form and has a bandwidth of 2*B MHz, a center frequency of a contiguous 2*B MHz operating channel can be matched to a boundary of each TV channel.

Moreover, a center frequency of an operating channel of 2*B MHz WLAN system may not be located on a boundary of every TV channel. For instance, like the minimum bandwidth B MHz channelization method mentioned in the foregoing description, if a center frequency of a WLAN operating channel is matched for an odd numbered channel to a frequency higher by (N−B)/2 MHz than a center frequency of a TV channel and a center frequency of a WLAN operating channel is matched for an even numbered channel to a frequency lower by (N−B)/2 MHz than a center frequency of a TV channel, a center frequency of a 2*B MHz operating channel can be matched to a boundary between the odd numbered TV channel and the even numbered TV channel. On the contrary, if a center frequency of a WLAN operating channel is matched for an odd numbered channel and an even numbered TV channel in a manner of being shifted in a direction opposite to that of the above method, a center frequency of a 2*B MHz operating channel can be matched to a boundary between the even numbered TV channel and the odd numbered TV channel.

In the following description, a case that a TV channel bandwidth N and a minimum bandwidth of an operating channel are 6 MHz and 4 MHz (B), respectively is taken as an example.

Figure 10:
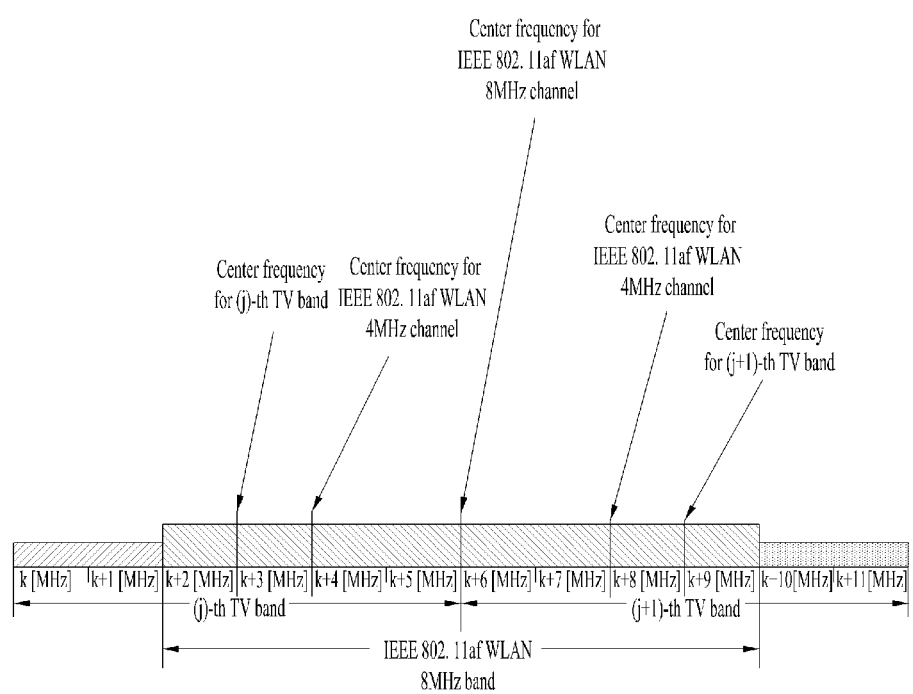
FIG. 10 is a diagram for one example of channelization according to the present invention in case that 2 contiguous TV channels are available.

FIG. 10 is a diagram for one example of channelization according to the present invention in case that 2 contiguous TV channels are available.

FIG. 10 shows one example of a case that a bandwidth of a WLAN operating channel is contiguous 8 MHz. And, a contiguous 8-MHz operating channel can be made by down-clocking a 40-MHz channel of IEEE 802.11ac by 5 times for example.

Referring to FIG. 10, a center frequency of an operating channel of IEEE 802.11af is not matched to a center frequency of a TV channel by applying the above-described method. Instead, a center frequency of an operating channel of IEEE 802.11af is matched to a boundary of each TV channel. So to speak, a center frequency of an operating channel of IEEE 802.11af is matched to a boundary between $j^{th}$ TV channel and $(j+1)^{th}$ TV channel.

Particularly, as mentioned in the foregoing description, for an odd numbered TV channel, a center frequency of 802.11af operating channel is matched to a frequency higher by 1 MHz (=(6−4)/2 MHz) than a center frequency of a TV channel. And, for an even numbered TV channel, a center frequency of 802.11af operating channel is matched to a frequency lower by 1 MHz (=(6−4)/2 MHz) than a center frequency of a TV channel. If this method applies, a center frequency of 8 MHz operating channel is matched to a boundary between an odd numbered TV channel and an even numbered TV channel. In particular, in FIG. 10, the $j^{th}$ TV channel may correspond to an odd numbered TV channel and the $(j+1)^{th}$ TV channel may correspond to an even numbered TV channel. On the contrary, in case that a center frequency of a WLAN operating channel is matched for an odd numbered channel and an even numbered channel in a manner of being shifted in a direction opposite to that of the above method, the $j^{th}$ TV channel may correspond to an even numbered TV channel and the $(j+1)^{th}$ TV channel may correspond to an odd numbered TV channel.

3) Channelization Method for Non-Contiguous 2*B MHz Operating Channel

If an operating channel is defined in a non-contiguous form and has a bandwidth of 2*B MHz, it is able to make a non-contiguous 2*B MHz operating channel using two B-MHz channels proposed in the description 1). In this case, if IEEE 802.11ac system supports 160 MHz bandwidth, it is able to use a method equal or similar to a method of making an operating channel using two 80 MHz bandwidths.

For the channelization of 2*B MHz operating channel, it is able to match each center frequency by applying the aforementioned channelization method for the B-MHz operating channel per WLAN B-MHz channel configuring the 2*B MHz operating channel.

In the following description, a case that a TV channel bandwidth N and a minimum bandwidth of an operating channel are 6 MHz and 4 MHz (B), respectively is taken as an example.

Figure 11:
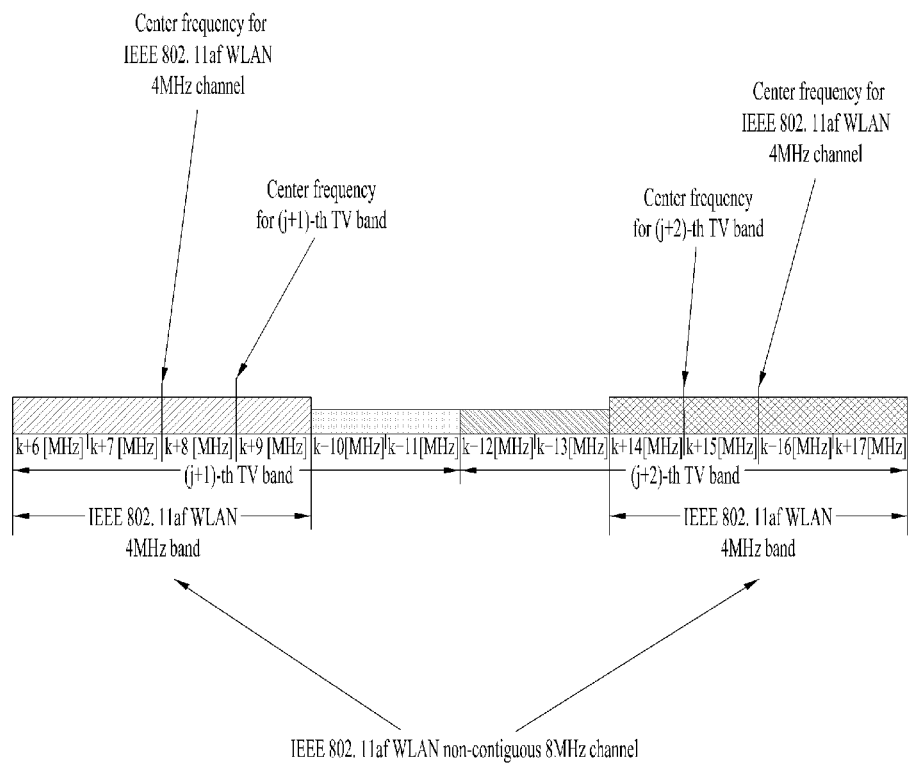
FIG. 11 is a diagram for one example of channelization according to the present invention in case that 2 contiguous TV channels are available.

FIG. 11 is a diagram for one example of channelization according to the present invention in case that 2 contiguous TV channels are available.

FIG. 11 shows one example of a case that a bandwidth of a WLAN operating channel is non-contiguous 8 MHz. And, it is able to make a non-contiguous 8-MHz operating channel using two 8-MHz channels of IEEE 802.11af.

Referring to FIG. 11, a center frequency of an operating channel of IEEE 802.11af is not matched to a center frequency of a TV channel. Instead, by applying a channelization method for each 4 MHz operating channel, a center frequency of an operating channel is matched in a manner of being shifted by 1 MHz (=(6−4)/2 MHz) to a lower or higher frequency. So to speak, for a $(j+1)^{th}$ TV channel, a center frequency of a WLAN operating channel (4 MHz) is matched to a frequency lower by 1 MHz than a center frequency of a TV channel. And, for a $(j+2)^{th}$ TV channel, a center frequency of a WLAN operating channel (4 MHz) is matched to a frequency higher by 1 MHz than a center frequency of a TV channel.

In this case, two TV channels having each operating channel belong thereto may be contiguous or non-contiguous. FIG. 11 illustrates one example that two TV channels are contiguous.

4) Channelization Method for Contiguous 4*B MHz

If an operating channel is defined in a contiguous form and has a bandwidth of 4*B MHz, a center frequency of a contiguous 4*B MHz operating channel can be matched to a boundary of each TV channel.

Moreover, a center frequency of an operating channel of 4*B MHz WLAN system may not be located on a boundary of every TV channel. For instance, like the minimum bandwidth B MHz channelization method mentioned in the foregoing description, if a center frequency of a WLAN operating channel is matched for an odd numbered channel to a frequency higher by (N−B)/2 MHz than a center frequency of a TV channel and a center frequency of a WLAN operating channel is matched for an even numbered channel to a frequency lower by (N−B)/2 MHz than a center frequency of a TV channel, a center frequency of a 2*B MHz operating channel can be matched to a boundary between every second odd numbered TV channel and every second even numbered TV channel (i.e., a boundary between second and third TV channels among 4 contiguous TV channels). On the contrary, if a center frequency of a WLAN operating channel is matched for an odd numbered channel and an even numbered TV channel in a manner of being shifted in a direction opposite to that of the above method, a center frequency of a 2*B MHz operating channel can be matched to a boundary between every second even numbered TV channel and every second odd numbered TV channel (i.e., a boundary between second and third TV channels among 4 contiguous TV channels). In particular, although the center frequency of the 2*B MHz channel is matched, as a B-MHz channel is configured next to a front of the 2*B MHz channel contiguously, it is able to configure a 4*B MHz operating channel overall. Thus, a center frequency of a 4*B MHz operating channel is located on one boundary between every two TV channels only among boundaries of TV channels on which a center frequency of a 2*B MHz operating channel can be located.

In the following description, a case that a TV channel bandwidth N and a minimum bandwidth of an operating channel are 6 MHz and 4 MHz (B), respectively is taken as an example.

Figure 12:
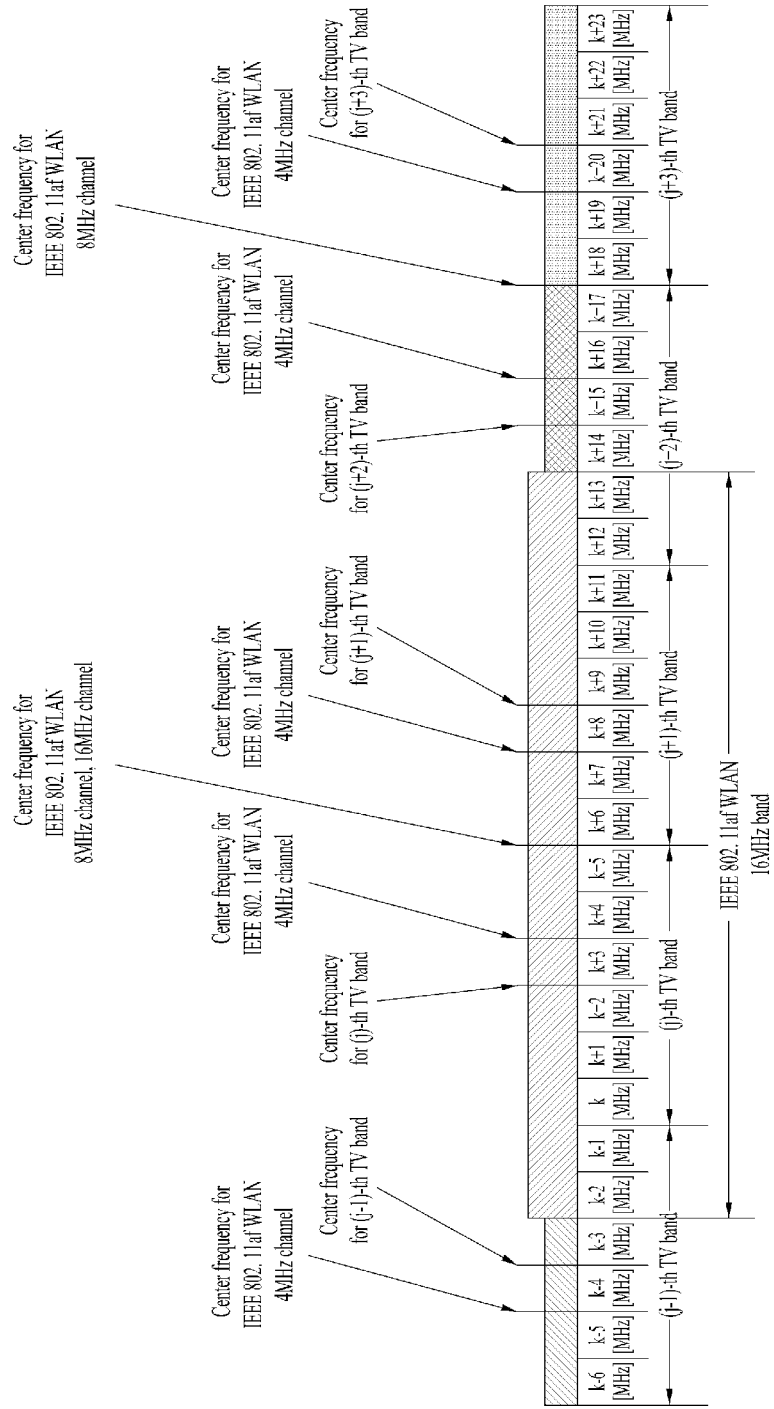
FIG. 12 is a diagram for one example of channelization according to the present invention in case that 4 contiguous TV channels are available.

FIG. 12 is a diagram for one example of channelization according to the present invention in case that 4 contiguous TV channels are available.

FIG. 12 shows one example of a case that a bandwidth of a WLAN operating channel is contiguous 16 MHz (4*B). And, a 16-MHz operating channel can be made by downclocking a 80-MHz channel of IEEE 802.11ac by 5 times for example.

Referring to FIG. 12, a center frequency of an operating channel of IEEE 802.11af is not matched to a center frequency of a TV channel by applying the above-described method. Instead, a center frequency of an operating channel of IEEE 802.11af is matched to a boundary of each TV channel. So to speak, a center frequency of an operating channel of IEEE 802.11af is matched to a boundary between $j^{th}$ TV channel and $(j+1)^{th}$ TV channel.

Particularly, as mentioned in the foregoing description, for an odd numbered TV channel, a center frequency of 802.11af operating channel is matched to a frequency higher by 1 MHz (=(6−4)/2 MHz) than a center frequency of a TV channel by the minimum bandwidth 4 MHz (B) channelization method. And, for an even numbered TV channel, a center frequency of 802.11af operating channel is matched to a frequency lower by 1 MHz (=(6−4)/2 MHz) than a center frequency of a TV channel. If this method applies, a center frequency of 8 MHz operating channel is matched to a boundary between every second odd numbered TV channel and every second even numbered TV channel. In particular, in FIG. 12, the $(j+1)^{th}$ TV channel may correspond to a second odd numbered TV channel and the $j^{th}$ TV channel may correspond to a second even numbered TV channel. On the contrary, in case that a center frequency of a WLAN operating channel is matched for an odd numbered channel and an even numbered channel in a manner of being shifted in a direction opposite to that of the above method, the $(j+1)^{th}$ TV channel may correspond to a second even numbered TV channel and the $j^{th}$ TV channel may correspond to a second odd numbered TV channel.

5) Channelization Method for Non-Contiguous 4*B MHz Operating Channel

If an operating channel is defined in a non-contiguous form and has a bandwidth of 4*B MHz, it is able to make a non-contiguous 4*B MHz operating channel using four B-MHz channels proposed in the description 1) or two 2*B MHz channels proposed in the description 2). Alternatively, it is able to make a non-contiguous 4*B MHz operating channel using two B-MHz channels proposed in the description 1) and one 2*B MHz channel proposed in the description 2).

For the channelization of 4*B MHz operating channel, it is able to match each center frequency by applying the aforementioned channelization method for the B-MHz operating channel/contiguous 2*B MHz operating channel per B-MHz channel/2*B MHz channel configuring the 4*B MHz operating channel.

Thus, although the channelization of 2*B MHz or 4*B MHz operating channel is performed using a B-MHz operating channel of a minimum bandwidth, since a location of B-MHz operating channel and a location of a preamble can be identically aligned on the 2*B or 4*B MHz operating channel, it is able to smoothly check or verify an operating channel through a preamble detection.

Moreover, since it is able to configure contiguous 2*B MHz or 4*B MHz operating channel to which B-MHz operating channel is adjacently contiguous, it is able to use IFFT (IDFT) having the same size in the legacy IEEE 802.11ac system.

2.2. Embodiment 2

In case of an operating channel of a WLAN system having a minimum bandwidth supported by TVWS of each country, a center frequency is located at a center of a TV channel. In case of an operating channel of a WLAN system having a bandwidth greater than the minimum bandwidth, a possible center frequency is located at an edge of the minimum bandwidth. In particular, in case of an operating channel having a minimum bandwidth, a center frequency of the corresponding operating channel is matched to a center frequency of a TV channel. Yet, in case of an operating channel not having a minimum bandwidth, a center frequency of the corresponding operating channel is matched to an edge of the minimum bandwidth.

For instance, since a bandwidth of each TV channel in U.S.A. is 6 MHz, a minimum bandwidth of a supported WLAN operating channel is assumed as 4 MHz or 5 MHz. Since a bandwidth of each TV channel in U.K. is 8 MHz, a minimum bandwidth of a supported WLAN operating channel is assumed as 40/6 MHz (=about 6.67 MHz). On these assumptions, a center frequency of an operating channel having 4-MHz or 5-MHz bandwidth in U.S.A. or a center frequency of an operating channel having 40/6 MHz (=about 6.67 MHz) bandwidth in U.K. is matched to a center frequency of a TV channel to which the corresponding operating channel belongs. On the other hand, for an operating channel having a bandwidth such as 8 MHz, 16 MHz and the like in case of a minimum bandwidth set to 4 MHz, an operating channel having a bandwidth such as 10 MHz, 20 MHz and the like in case of a minimum bandwidth set to 5 MHz, and an operating channel having a bandwidth such as 80/6 MHz (=about 13.3 MHz) and the like in case of a minimum bandwidth set to 40/6 MHz (=about 6.67 MHz), a possible center frequency is located at an edge of the minimum bandwidth. Of course, this is identically applicable to a case that a minimum bandwidth of a WLAN operating channel has a bandwidth different from the above.

1) Channelization Method of Minimum Bandwidth B MHz

In case of an operating channel having a bandwidth of a minimum bandwidth B MHz, a center frequency of the corresponding operating channel is matched to a center frequency of a TV channel to which the corresponding operating channel belongs.

In the following description, a case that a TV channel bandwidth N and a minimum bandwidth of an operating channel are 6 MHz and 5 MHz (B), respectively is taken as an example.

Figure 13:
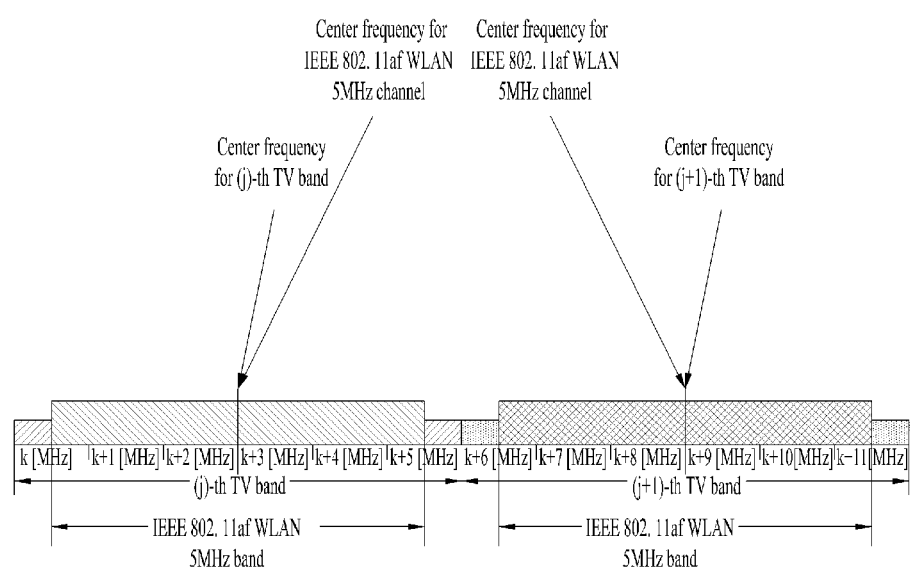
FIG. 13 is a diagram for one example of channelization according to the present invention in case that a single TV channel is available.

FIG. 13 is a diagram for one example of channelization according to the present invention in case that a single TV channel is available.

FIG. 13 shows one example of a case that a bandwidth of a WLAN operating channel is 5 MHz. And, a 5-MHz operating channel can be made by down-clocking a 20-MHz channel of IEEE 802.11ac by 4 times or by down-clocking a 40-MHz channel of IEEE 802.11ac by 8 times, for example.

Referring to FIG. 13, a center frequency of an operating channel of IEEE 802.11af is matched to a center frequency of a TV channel by applying the aforementioned method. In particular, a center frequency of a WLAN operating channel is matched in $j^{th}$ TV channel and $(j+1)^{th}$ TV channel.

2) Channelization Method for Contiguous 2*B MHz

If an operating channel is defined in a contiguous form and has a bandwidth of 2*B MHz, a center frequency of a contiguous 2*B MHz operating channel is located at an edge of a minimum bandwidth B MHz channel configuring the corresponding operating channel. In particular, after a center frequency of each minimum bandwidth B MHz channel has been matched to a center frequency of a TV channel to which the corresponding channel belongs, while one of two minimum bandwidth B MHz channels is fixed, a center frequency of a contiguous 2*B MHz operating channel is located at an edge of the fixed channel.

In the following description, a case that a TV channel bandwidth N and a minimum bandwidth of an operating channel are 6 MHz and 5 MHz (B), respectively is taken as an example.

Figure 14:
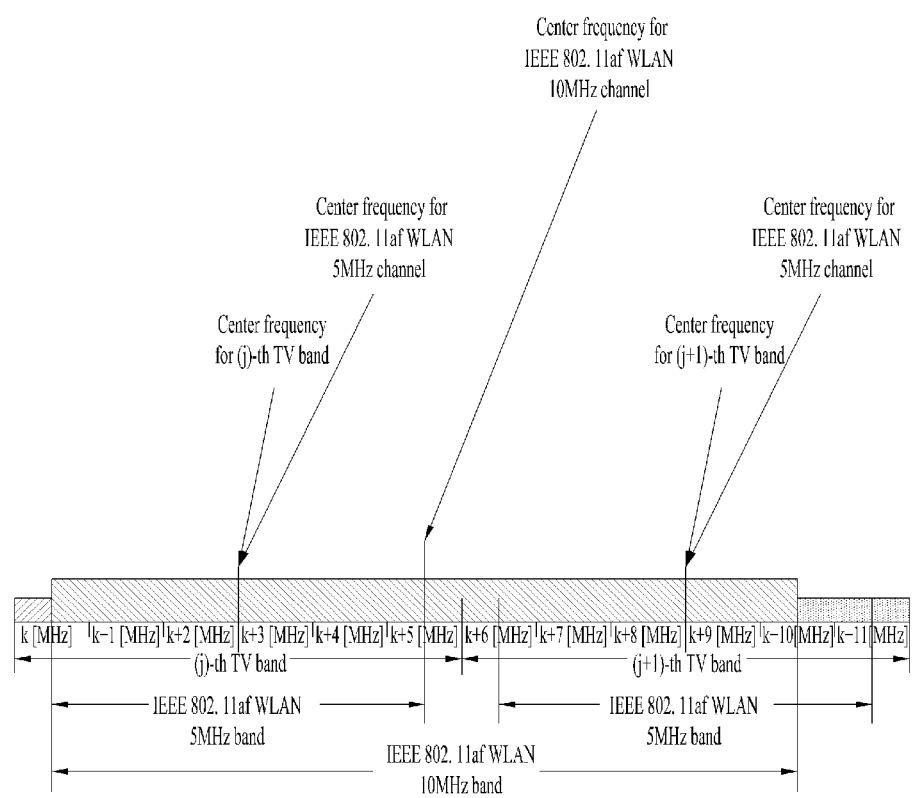
FIG. 14 and FIG. 15 are diagrams for examples of channelization according to the present invention in case that 2 contiguous TV channels are available.
Figure 15:
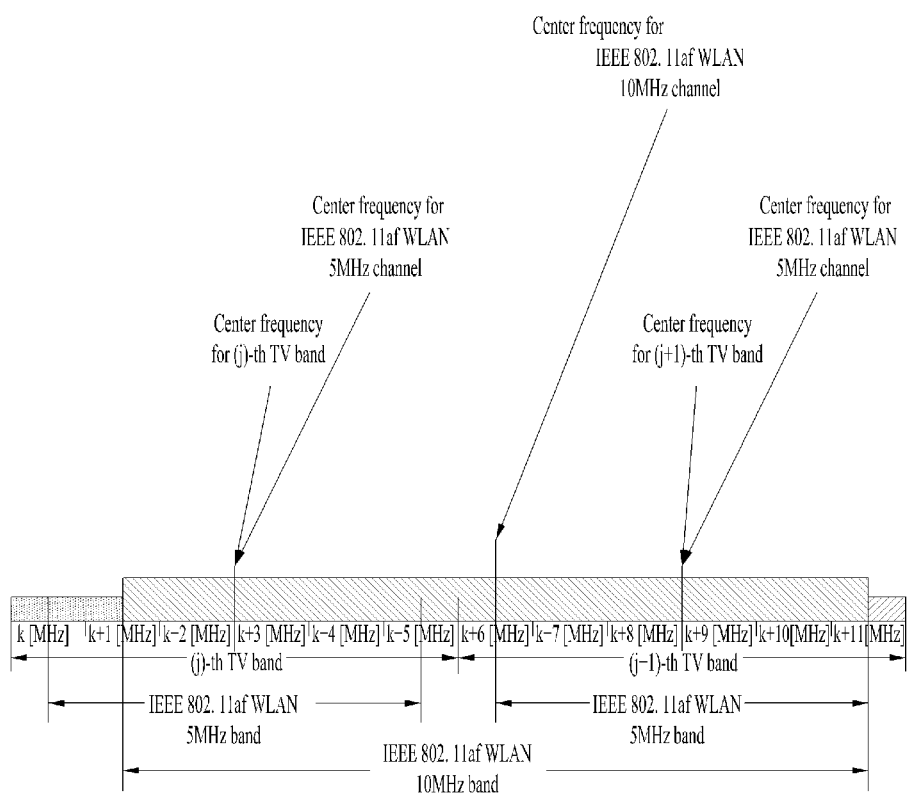

FIG. 14 and FIG. 15 are diagrams for examples of channelization according to the present invention in case that 2 contiguous TV channels are available.

FIG. 14 and FIG. 15 show examples of a case that a bandwidth of a WLAN operating channel is contiguous 10 MHz. And, contiguous 10-MHz operating channel can be made by down-clocking a 40-MHz channel of IEEE 802.11ac by 4 times or by down-clocking a 80-MHz channel of IEEE 802.11 ac by 8 times, for example.

Referring to FIG. 14 and FIG. 15, a center frequency of an operating channel of IEEE 802.11af is not matched to a center frequency of a TV channel or an edge of a contiguous TV channel by applying the aforementioned method. Instead, a center frequency of an operating channel of IEEE 802.11 af is matched to an edge of a minimum bandwidth 5 MHz configuring the operating channel of IEEE 802.11af.

FIG. 14 shows a case of matching a center frequency of a minimum bandwidth 5 MHz channel located on a left side to a center frequency of a $j^{th}$ TV channel having the corresponding channel belong thereto and matching a center frequency of an operating channel of IEEE 802.11af having a 10-MHz bandwidth to a right edge of the corresponding minimum bandwidth 5 MHz channel. In particular, this is identical to the case that a minimum bandwidth 5 MHz channel located on a right side is shifted while a minimum bandwidth 5 MHz channel located on a left side is fixed. On the other hand, FIG. 15 shows a case of matching a center frequency of a minimum bandwidth 5 MHz channel located on a right side to a center frequency of a $(j+1)^{th}$ TV channel having the corresponding channel belong thereto and matching a center frequency of an operating channel of IEEE 802.11af having a 10-MHz bandwidth to a left edge of the corresponding minimum bandwidth 5 MHz channel. In particular, this is identical to the case that a minimum bandwidth 5 MHz channel located on a left side is shifted while a minimum bandwidth 5 MHz channel located on a right side is fixed.

3) Channelization Method for Non-Contiguous 2*B MHz Operating Channel

If an operating channel is defined in a non-contiguous form and has a bandwidth of 2*B MHz, it is able to make a non-contiguous 2*B MHz operating channel using two B-MHz channels proposed in the former description 1). In this case, if IEEE 802.11ac system supports 160 MHz bandwidth, it is able to use a method equal or similar to a method of making an operating channel using two 80 MHz bandwidths.

For the channelization of 2*B MHz operating channel, it is able to match each center frequency by applying the aforementioned channelization method for the B-MHz operating channel per WLAN B-MHz channel configuring the 2*B MHz operating channel.

4) Channelization Method for Contiguous 4*B MHz

If an operating channel is defined in a contiguous form and has a bandwidth of 4*B MHz, a center frequency of a contiguous 4*B MHz operating channel is located at an edge of 2*B MHz channel configuring the corresponding operating channel. In particular, while a center frequency of each 2*B MHz channel is located at an edge of one of two minimum bandwidth B-MHz channels configuring the each 2*B MHz channel by applying the method proposed by the former description 2), a center frequency of contiguous 4*B MHz operating channel is located on an edge of one of two 2*B MHz channels.

5) Channelization Method for Non-Contiguous 4*B MHz Operating Channel

If an operating channel is defined in a non-contiguous form and has a bandwidth of 4*B MHz, it is able to make a non-contiguous 4*B MHz operating channel using four B-MHz channels proposed in the former description 1) or two 2*B MHz channels proposed in the former description 2). Alternatively, it is able to make a non-contiguous 4*B MHz operating channel using two B-MHz channels proposed in the former description 1) and one 2*B MHz channel proposed in the former description 2).

For the channelization of 4*B MHz operating channel, it is able to match each center frequency by applying the aforementioned channelization method for the B-MHz operating channel/contiguous 2*B MHz operating channel per B-MHz channel/2*B MHz channel configuring the 4*B MHz operating channel.

Thus, although the channelization of 2*B MHz or 4*B MHz operating channel is performed using a B-MHz operating channel of a minimum bandwidth according to the present embodiment, if a B-MHz channel having its location unchanged is set as a primary channel, since a location of B-MHz operating channel and a location of a preamble can be identically aligned on the 2*B or 4*B MHz operating channel as well, it is able to smoothly check or verify an operating channel through a preamble detection.

Moreover, since it is able to configure contiguous 2*B MHz or 4*B MHz operating channel to which B-MHz operating channel is adjacently contiguous, it is able to use IFFT (IDFT) having the same size in the legacy IEEE 802.11ac system.

2.3. Embodiment 3

As mentioned in the foregoing description, in order for an STA to operate in TVWS, a protection scheme for an incumbent device (or a licensed device) should be preferentially provided. Hence, channelization can be performed differently depending on a case that the incumbent device such as a TV and the like is using a left side (i.e., a lower frequency) or a right side (i.e., a higher frequency) of a TV channel used by WLAN. In particular, a center frequency of an operating channel can be configured different depending on a TV channel used by an incumbent device among TV channels adjacent to a TV channel set as the operating channel. According to the present embodiment, in case of the non-contiguous 2*B MHz or 4*B MHz operating channel, it may be able to follow the methods explained in the former descriptions 2.1 and 2.2.

In case that an incumbent device uses a TV channel adjacent to a TV channel used by WLAN, cases can be sorted depending a location of the TV channel used by the incumbent device as follows.

Case 1 corresponds to a case that an incumbent device currently uses a TV channel adjacent to a left side (i.e., a lower frequency) of a TV channel used by WLAN. In particular, if the WLAN uses $j^{th}$ TV channel, it means a case that the incumbent device currently uses $(j-1)^{th}$ TV channel. In doing so, assume that $(j+1)^{th}$ TV channel is not used by the incumbent device currently.

Case 2 corresponds to a case that an incumbent device currently uses a TV channel adjacent to a right side (i.e., a higher frequency) of a TV channel used by WLAN. In particular, if the WLAN uses $j^{th}$ TV channel, it means a case that the incumbent device currently uses $(j+1)^{th}$ TV channel. In doing so, assume that $(j-1)^{th}$ TV channel is not used by the incumbent device currently.

Case 3 corresponds to a case that an incumbent device currently uses a TV channel adjacent to a left side (i.e., a lower frequency) of a TV channel used by WLAN and a TV channel adjacent to a right side (i.e., a higher frequency) of the channel used by the WLAN. In particular, if the WLAN uses $j^{th}$ TV channel, it means a case that the incumbent device currently uses $(j-1)^{th}$ TV channel and $(j+1)^{th}$ TV channel.

1) Channelization Method for Minimum Bandwidth B MHz

In order to perform channelization of a minimum bandwidth B MHz of a WLAN operating channel, the channelization can be performed for each case.

In Case 1 and Case 2, channelization can be performed in a manner similar to the method mentioned in the former description 2.1. In particular, if the incumbent device currently uses one of TV channels adjacent to a TV channel set as an operating channel, a center frequency of the operating channel can be located in a manner of being spaced apart from a center frequency of the TV channel set as the operating channel by a predetermined frequency in a direction opposite to that of the TV channel currently used by the incumbent device. In this case, a value of the predetermined frequency can be determined as a bandwidth of the TV channel and a minimum frequency bandwidth supported by the operating channel. For instance, in Case 1, a center frequency of a WLAN operating channel can be matched to a frequency higher by (N−B)/2 MHz than a center frequency of $j^{th}$ TV channel. For instance, in Case 2, a center frequency of a WLAN operating channel can be matched to a frequency lower r by (N−B)/2 MHz than a center frequency of $j^{th}$ TV channel.

In Case 3, channelization can be performed in the same manner of the method explained in the former description 2.2. In particular, a center frequency of a WLAN operating channel can be matched to a center frequency of a TV channel to which the corresponding operating channel belongs.

In the following description, a case that a TV channel bandwidth N and a minimum bandwidth of an operating channel are 6 MHz and 5 MHz (B), respectively is taken as an example.

Figure 16:
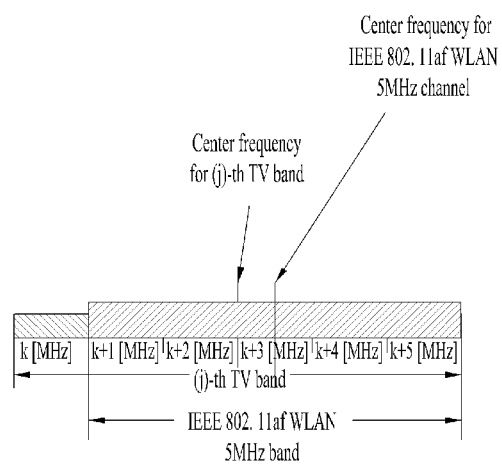
FIGS. 16 to 18 are diagrams for examples of channelization according to the present invention in case that a single TV channel is available.
Figure 17:
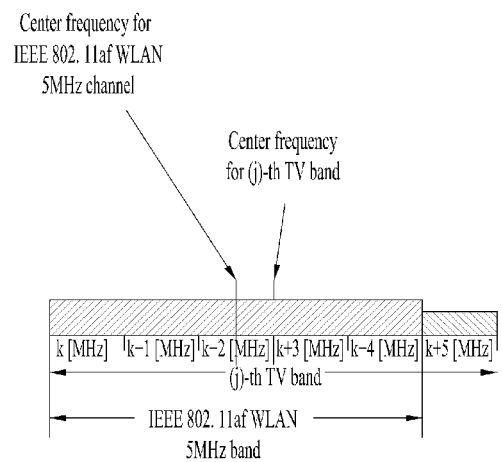
Figure 18:
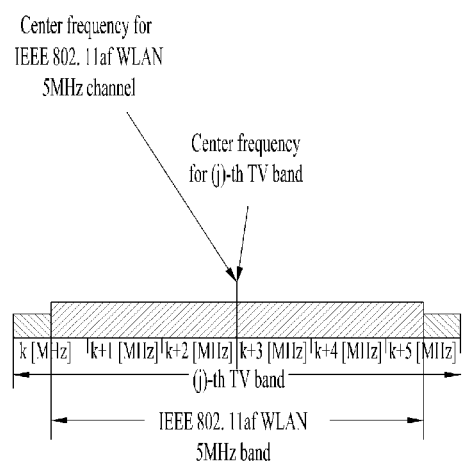

FIGS. 16 to 18 are diagrams for examples of channelization according to the present invention in case that a single TV channel is available.

FIGS. 16 to 18 show examples of a case that a bandwidth of a WLAN operating channel is 5 MHz. And, a 5-MHz operating channel can be made by down-clocking a 20-MHz channel of IEEE 802.11ac by 4 times or by down-clocking a 40-MHz channel of IEEE 802.11ac by 8 times, for example.

FIG. 16 shows one example of a case as follows. First of all, if an incumbent device uses a TV channel adjacent to a left side (i.e., a lower frequency) of a TV channel used by a WLAN [Case 1], a center frequency of an operating channel of IEEE 802.11af is matched in a manner of being shifted to a frequency higher by ½ MHz (=(6−5)/2 MHz). In particular, a center frequency of a WLAN operating channel is matched to a frequency higher by ½ MHz than a center frequency of a TV channel on $j^{th}$ TV channel.

FIG. 17 shows one example of a case as follows. First of all, if an incumbent device uses a TV channel adjacent to a right side (i.e., a higher frequency) of a TV channel used by a WLAN [Case 2], a center frequency of an operating channel of IEEE 802.11af is matched in a manner of being shifted to a frequency lower by ½ MHz (=(6−5)/2 MHz). In particular, a center frequency of a WLAN operating channel is matched to a frequency lower by ½MHz than a center frequency of a TV channel on $j^{th}$ TV channel.

FIG. 18 shows one example of a case as follows. First of all, if an incumbent device uses a TV channel adjacent to a left side (i.e., a lower frequency) of a TV channel used by a WLAN and a right side (i.e., a higher frequency) of the TV channel [Case 3], a center frequency of an operating channel of IEEE 802.11af is matched to a center frequency of the TV channel. In particular, a center frequency of an operating channel is matched on $j^{th}$ TV channel.

2) Channelization Method for Contiguous 2*B MHz Channel

If an operating channel is defined in a contiguous form and has a bandwidth of 2*B MHz, channelization can be performed for each case as follows.

In Case 1 and Case 2, channelization can be performed in a manner similar to the method mentioned in the former description 2.1. In particular, if TV channels for setting an operating channel include 2 contiguous TV channels, a center frequency of the operating channel can be located on a boundary between two contiguous TV channels. For instance, in Case 1, a center frequency of a 2*B MHz operating channel can be matched to a boundary between $j^{th}$ TV channel and $(j+1)^{th}$ TV channel. For instance, in Case 2, a center frequency of a 2*B MHz operating channel can be matched to a boundary between $j^{th}$ TV channel and $(j−1)^{th}$ TV channel. Yet, in Case 3, channelization for contiguous 2*B MHz operating channel can be performed.

In the following description, a case that a TV channel bandwidth N and a minimum bandwidth of an operating channel are 6 MHz and 5 MHz (B), respectively is taken as an example.

Figure 19:
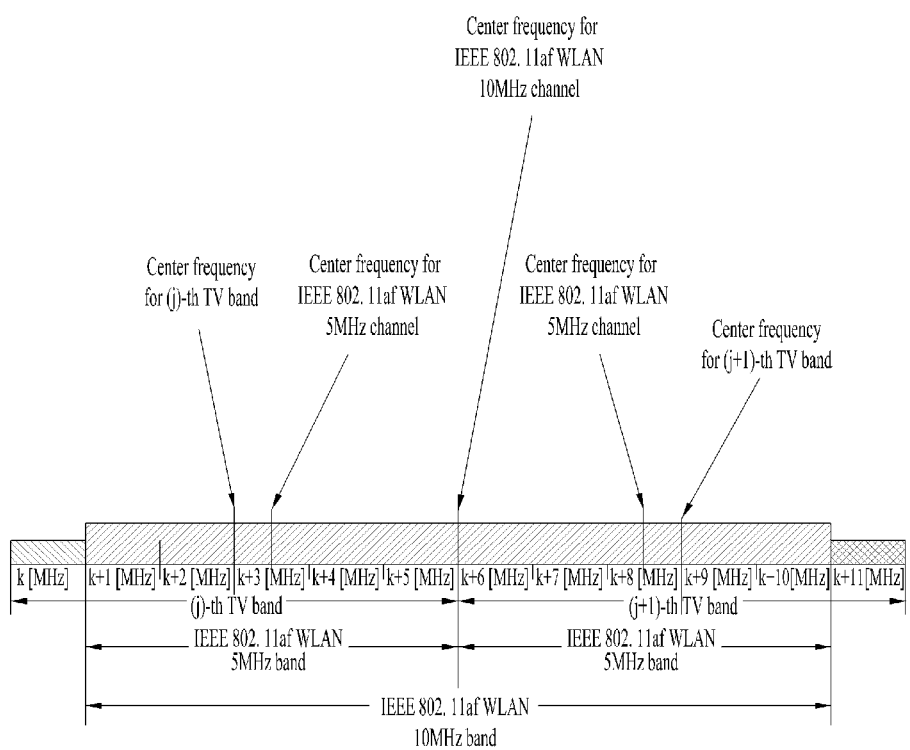
FIG. 19 is a diagram for one example of channelization according to the present invention in case that 2 contiguous TV channels are available.

FIG. 19 is a diagram for one example of channelization according to the present invention in case that 2 contiguous TV channels are available.

FIG. 19 shows one example of a case that a bandwidth of a WLAN operating channel is 10 MHz. And, contiguous 10-MHz operating channel can be made by down-clocking a 40-MHz channel of IEEE 802.11ac by 4 times or by down-clocking a 80-MHz channel of IEEE 802.11ac by 8 times, for example.

Referring to FIG. 19, if an incumbent device uses a TV channel adjacent to a left side (i.e., a lower frequency) or a right side (i.e., a higher frequency) of a TV channel used by a WLAN [Case 1 or Case 2], a center frequency of contiguous 2*B MHz operating channel is matched to a boundary between $j^{th}$ TV channel and $(j+1)^{th}$ TV channel.

3) Channelization Method for Contiguous 4*B MHz Channel

If an operating channel is defined in a contiguous form and has a bandwidth of 4*B MHz, channelization can be performed for each case as follows.

In Case 1 and Case 2, channelization can be performed in a manner similar to the method mentioned in the former description 2.1. In particular, if TV channels for setting an operating channel include 4 contiguous TV channels, a center frequency of the operating channel can be located on a boundary between second and third TV channels among the four contiguous TV channels.

Yet, in Case 1, assume that $(j+2)^{th}$ TV channel and $(j+3)^{th}$ TV channel are not currently used by an incumbent device. In this case, a center frequency of contiguous 4*B MHz operating channel can be matched to a boundary between $(j+1)^{th}$ TV channel and $(j+2)^{th}$ TV channel. Moreover, in Case 2, assume that $(j−2)^{th}$ TV channel and $(j−3)^{th}$ TV channel are not currently used by an incumbent device. In this case, a center frequency of contiguous 4*B MHz operating channel can be matched to a boundary between $(j−1)^{th}$ TV channel and $(j−2)^{th}$ TV channel. Yet, in Case 3, it is unable to perform a channelization for contiguous 4*B MHz operating channel.

So far, in case that a frequency bandwidth is changed by down-clocking a frame of IEEE 802.11ac, a channelization method for IEEE 802.11af operating channel having the changed frequency bandwidth is described.

In particular, referring now to FIG. 5, the enabling STA capable of accessing the GDB accesses the GDB and then obtains an available channel list on TVWS band of an area in which the enabling STA is located like the step S501. The enabling STA able to inform the dependent STA, which is unable to access the GDP, of the information on the available TV channel like the step S507 or the step S513.

In doing so, the enabling STA is able to inform the dependent STA what kind of TV channel is available on a band that is not a TV band. The dependent STA can obtain a beacon frame (or a GDC enabling signal) by scanning a channel having all possible frequency bandwidth and is able to use the corresponding channel in accordance with a procedure (e.g., the steps S505 to S515 in FIG. 5) defined for a beacon frame transmitted channel by IEEE 802.11af system. In this case, a center frequency of each operating channel is defined by the methods explained in the former descriptions 2.1. To 2.3. And the dependent STA may be able to perform the scanning several times in accordance with a bandwidth of each operating channel.

Moreover, the dependent STA performs a scanning on a channel having a minimum bandwidth (e.g., 4 MHz, 5 MHz, 40/6 MHz (=about 6.67 MHz) only and is able to obtain information on a bandwidth of an operating channel from the enabling STA through a signal. For instance, like a frame structure of IEEE 802.11ac uses a preamble of 20-MHz frame repeatedly as a preamble section of each bandwidth, a frame structure of IEEE 802.11af, which down-clocks a frame of IEEE 802.11ac 5 times (4 MHz case), 4 times or 5 times (5 MHz case), or 6 times (40/6 MHz case (about 6.67 MHz case)), uses a preamble of a minimum bandwidth (4 MHz, 5 MHz, 40/6 MHz (=about 6.67 MHz))) repeatedly as a preamble section of each bandwidth. Hence, if the dependent STA obtains the information on the bandwidth of the operating channel through signal, it is possible to scan the operating channel having the corresponding bandwidth. In this case, the enabling STA can periodically broadcast information (e.g., bandwidth information of an operating channel) on a channel used by BSS on every minimum bandwidth operating channel that overlaps a channel currently used by the BSS of the enabling STA entirely or in part.

3. The General of a Device to which the Invention is Applicable

Figure 20:
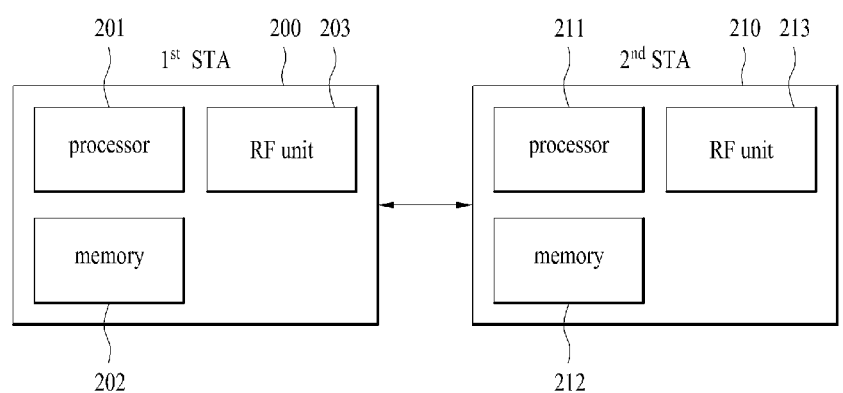
FIG. 20 is a block diagram for a configuration of a wireless communication device according to one embodiment of the present invention.

FIG. 20 is a block diagram for a configuration of a wireless communication device according to one embodiment of the present invention.

Referring to FIG. 20, a first STA 200 includes a processor 201, a memory 202 and an RF (radio frequency) unit 203. The processor 201 implements the functions, processes and/or methods proposed by the present invention. Layers of a radio interface protocol can be implemented by the processor 201. The memory 202 is connected to the processor 201 and stores various kinds of informations for driving the processor 201. The RF unit 203 is connected to the processor 201 and then transmits and/or receives radio signals.

A second STA 210 includes a processor 211, a memory 212 and an RF (radio frequency) unit 213. The processor 211 implements the functions, processes and/or methods proposed by the present invention. Layers of a radio interface protocol can be implemented by the processor 211. The memory 212 is connected to the processor 211 and stores various kinds of informations for driving the processor 211. The RF unit 213 is connected to the processor 211 and then transmits and/or receives radio signals.

The memory 202/212 may be included inside or outside the processor 201/211 and then connected to the processor 201/211 via a means known well to the public. Optionally, the first STA 200 and/or the second STA 210 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Various embodiments according to the present invention are mainly described with reference to the examples applying to IEEE 802.11 system and can apply to various kinds of wireless access systems as well as to IEEE 802.11 system.

What is claimed is:

1. A method of configuring an operating channel, which is configured by a first device on a white space band, the method comprising:
    obtaining an information on an available television (TV) channel from a geo-location database; and
    configuring the operating channel based on the information on the available TV channel,
    wherein a center frequency of the operating channel is set differently depending on a first TV channel used by an incumbent device among TV channels adjacent to a second TV channel having the operating channel configured therein,
    wherein the center frequency of the operating channel is spaced apart from a center frequency of the second TV channel by a prescribed frequency in a direction opposite to the first TV channel, and
    wherein the prescribed frequency is determined as a bandwidth of the second TV channel, and a minimum frequency bandwidth supported by the operating channel.

2. The method of claim 1, wherein the prescribed frequency is determined as (N−B)/2, where:
    N is a bandwidth of the second TV channel, and
    B indicates a minimum frequency bandwidth supported by the operating channel.

3. The method of claim 1, further comprising periodically transmitting an information on a bandwidth of the configured operating channel to a second device through a channel having a minimum frequency bandwidth supported by the operating channel.

4. In a first device for configuring an operating channel on a white space band, an apparatus comprising:
    an RF (radio frequency) transceiver configured to transceive a wireless signal; and
    a processor configured to:
        obtain an information on an available television (TV) channel from a geo-location database; and
        configure the operating channel based on the information on the available TV channel,
    wherein a center frequency of the operating channel is set differently depending on a first TV channel used by an incumbent device among TV channels adjacent to a second TV channel having the operating channel configured therein, wherein the center frequency of the operating channel is spaced apart from a center frequency of the second TV channel by a prescribed frequency in a direction opposite to the first TV channel, and wherein the prescribed frequency is determined as a bandwidth of the second TV channel and a minimum frequency bandwidth supported by the operating channel.

5. The apparatus of claim 4, wherein the prescribed frequency is determined as $(N-B)/2$, where:

N is a bandwidth of the second TV channel, and

B indicates a minimum frequency bandwidth supported by the operating channel.

6. The apparatus of claim 4, wherein the processor is further configured to periodically transmit an information on a bandwidth of the configured operating channel to a second device through a channel having a minimum frequency bandwidth supported by the operating channel.

* * * * *